United States Patent
Yamazaki et al.

(10) Patent No.: US 10,805,059 B2
(45) Date of Patent: Oct. 13, 2020

(54) RADIO TERMINAL AND BASE STATION

(71) Applicant: KYOCERA CORPORATION, Kyoto (JP)

(72) Inventors: Chiharu Yamazaki, Tokyo (JP); Kugo Morita, Yokohama (JP); Masato Fujishiro, Yokohama (JP); Hiroyuki Urabayashi, Yokohama (JP); Mayumi Komura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/904,566

(22) Filed: Feb. 26, 2018

(65) Prior Publication Data

US 2018/0191483 A1 Jul. 5, 2018

Related U.S. Application Data

(63) Continuation of application No. PCT/JP2016/072439, filed on Jul. 29, 2016.
(Continued)

(51) Int. Cl.
*H04L 5/14* (2006.01)
*H04L 5/00* (2006.01)
(Continued)

(52) U.S. Cl.
CPC .............. *H04L 5/14* (2013.01); *H04L 5/0037* (2013.01); *H04L 5/0051* (2013.01);
(Continued)

(58) Field of Classification Search
CPC ....... H04L 5/14; H04L 5/0037; H04L 5/0051; H04L 5/0055; H04L 5/1469;
(Continued)

(56) References Cited

U.S. PATENT DOCUMENTS

| 2007/0232244 A1* | 10/2007 | Mo | H04B 1/719 455/91 |
| 2013/0010659 A1* | 1/2013 | Chen | H04L 5/001 370/280 |

(Continued)

FOREIGN PATENT DOCUMENTS

| JP | 2012-065298 A | 3/2012 |
| JP | 2015-506631 A | 3/2015 |

(Continued)

OTHER PUBLICATIONS

International Search Report issued in PCT/JP2016/072439; dated Oct. 11, 2016.

*Primary Examiner* — Habte Mered
(74) *Attorney, Agent, or Firm* — Studebaker & Brackett PC

(57) ABSTRACT

A radio terminal according to one embodiment comprises a controller configured to perform radio communication in a time division duplex system, with a base station. The controller is configured to receive a downlink radio signal from the base station; and transmit to the base station, response information indicating whether reception of the downlink radio signal is successful, wherein the response information is transmitted by using an uplink radio resource different from an uplink control channel resource even if the uplink radio resource is not allocated for data transmission from the base station.

11 Claims, 17 Drawing Sheets

Related U.S. Application Data

(60) Provisional application No. 62/212,024, filed on Aug. 31, 2015.

(51) Int. Cl.
  *H04W 72/04* (2009.01)
  *H04W 74/08* (2009.01)
  *H04W 88/02* (2009.01)
  *H04W 88/08* (2009.01)

(52) U.S. Cl.
  CPC .......... *H04L 5/0055* (2013.01); *H04L 5/1469* (2013.01); *H04W 72/044* (2013.01); *H04W 72/0413* (2013.01); *H04W 74/0833* (2013.01); *H04L 5/001* (2013.01); *H04L 5/0012* (2013.01); *H04L 5/0023* (2013.01); *H04W 72/0446* (2013.01); *H04W 88/02* (2013.01); *H04W 88/08* (2013.01)

(58) Field of Classification Search
  CPC ....... H04L 5/0012; H04L 5/0023; H04L 1/18; H04W 72/0413; H04W 72/044; H04W 72/0446; H04W 74/0833
  See application file for complete search history.

(56) References Cited

U.S. PATENT DOCUMENTS

| | | |
|---|---|---|
| 2013/0114501 A1 | 5/2013 | Kishiyama et al. |
| 2013/0329687 A1* | 12/2013 | Yagi ..................... H04L 5/0037 370/329 |
| 2014/0169260 A1* | 6/2014 | Nishio ................. H04J 11/0079 370/312 |
| 2014/0293947 A1* | 10/2014 | Nishikawa ........ H04W 72/1257 370/329 |
| 2014/0341192 A1* | 11/2014 | Venkob ................. H04W 24/00 370/336 |
| 2014/0362806 A1* | 12/2014 | Liu ....................... H04W 72/14 370/329 |
| 2015/0003353 A1 | 1/2015 | Yang et al. |
| 2015/0124746 A1* | 5/2015 | Wu ................... H04W 74/0833 370/329 |
| 2016/0036573 A1 | 2/2016 | Tanaka et al. |
| 2016/0143035 A1* | 5/2016 | Xue .................... H04W 72/048 370/329 |
| 2016/0174263 A1* | 6/2016 | Webb ................ H04W 74/0833 370/329 |
| 2016/0352403 A1* | 12/2016 | Kishiyama ........... H04B 7/0695 |
| 2016/0381680 A1* | 12/2016 | Yasukawa ........ H04W 72/1289 370/280 |
| 2017/0230957 A1* | 8/2017 | Wakabayashi ........ H04W 76/14 |
| 2017/0290064 A1* | 10/2017 | Liu ................... H04W 74/0833 |
| 2018/0076946 A1* | 3/2018 | Li ........................... H04L 5/001 |

FOREIGN PATENT DOCUMENTS

| | | |
|---|---|---|
| WO | 2013/021551 A1 | 2/2013 |
| WO | 2014/141628 A1 | 9/2014 |
| WO | 2015/108068 A1 | 7/2015 |
| WO | 2015/119076 A1 | 8/2015 |

* cited by examiner

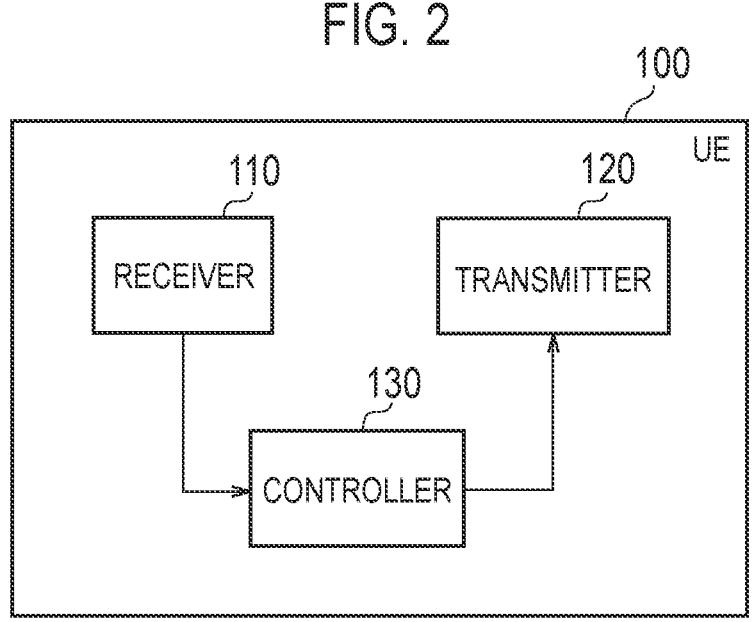
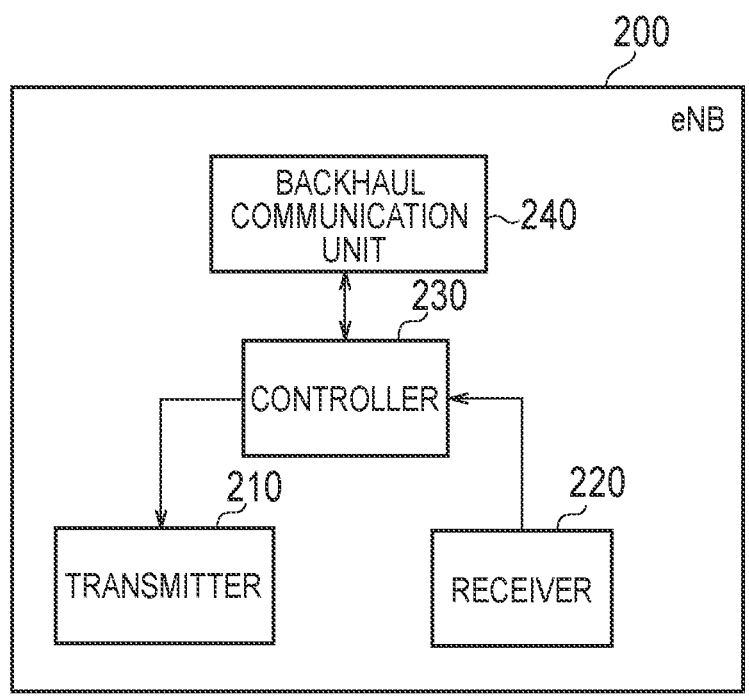

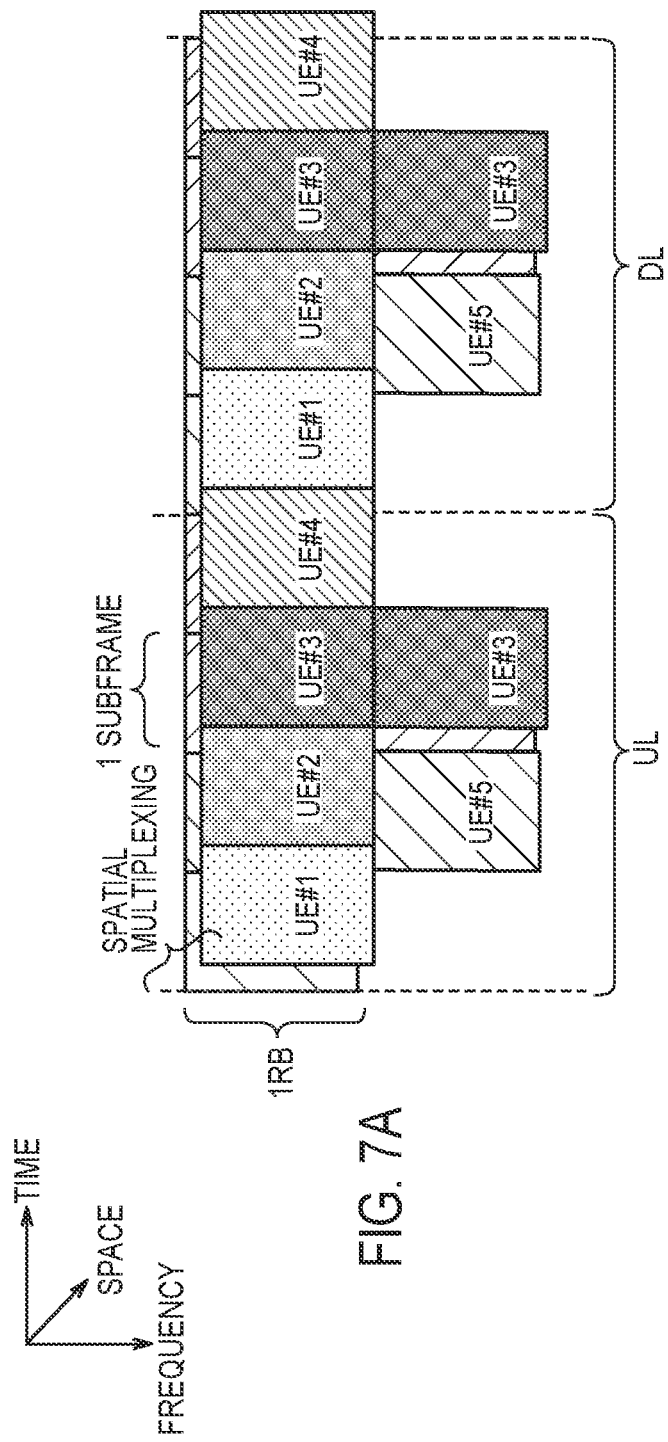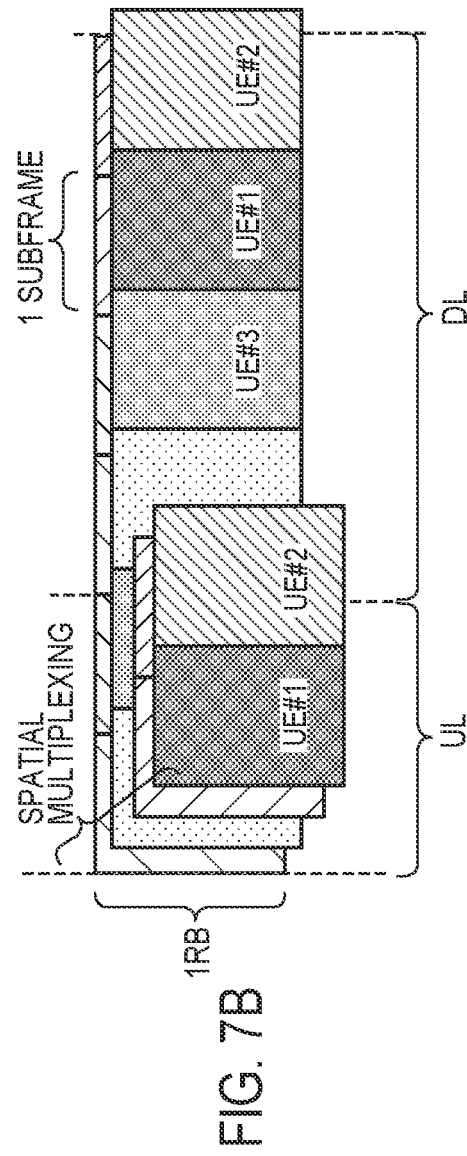

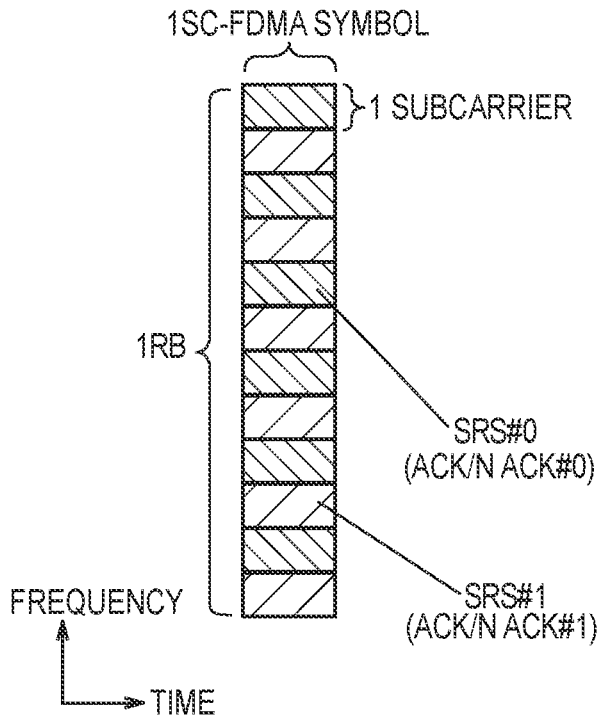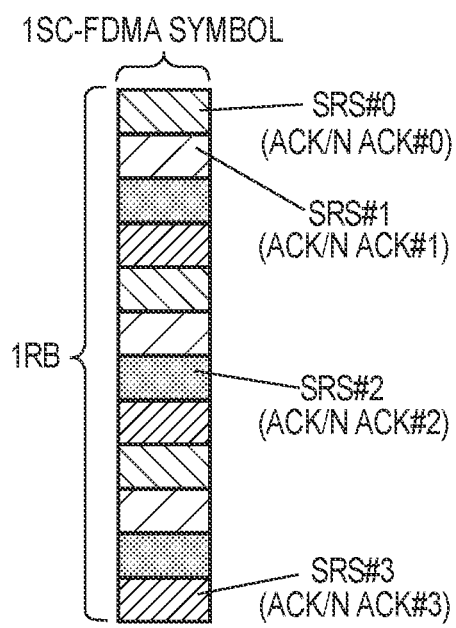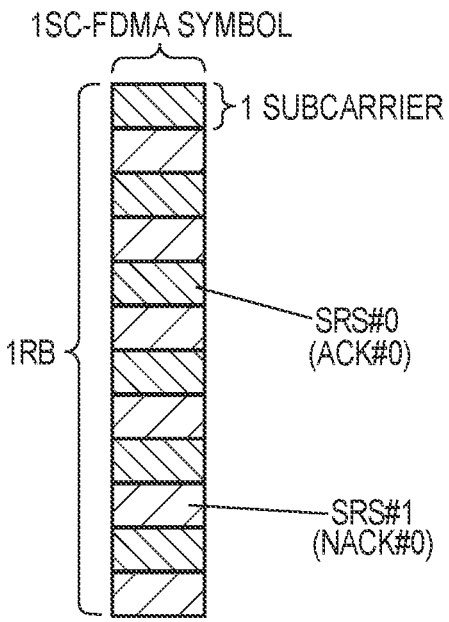

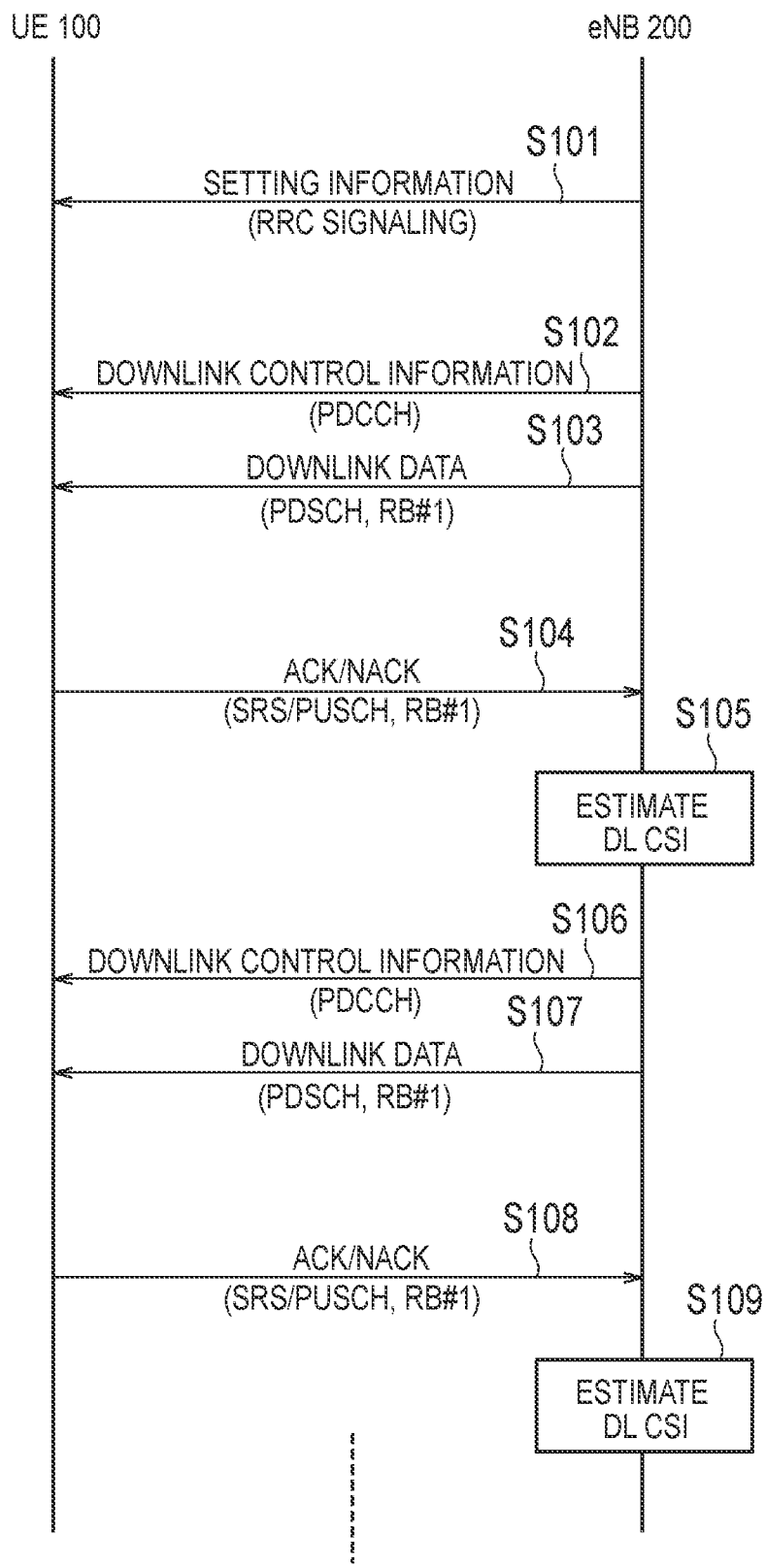

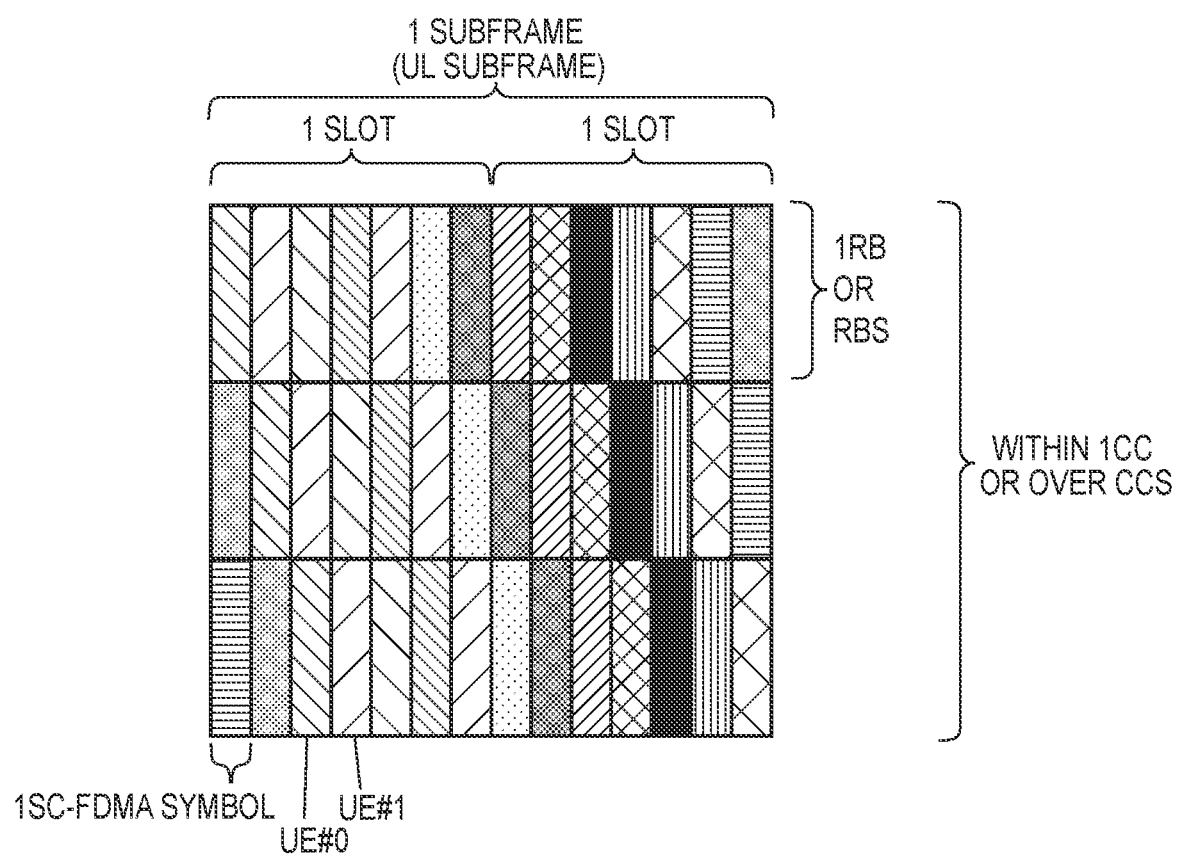

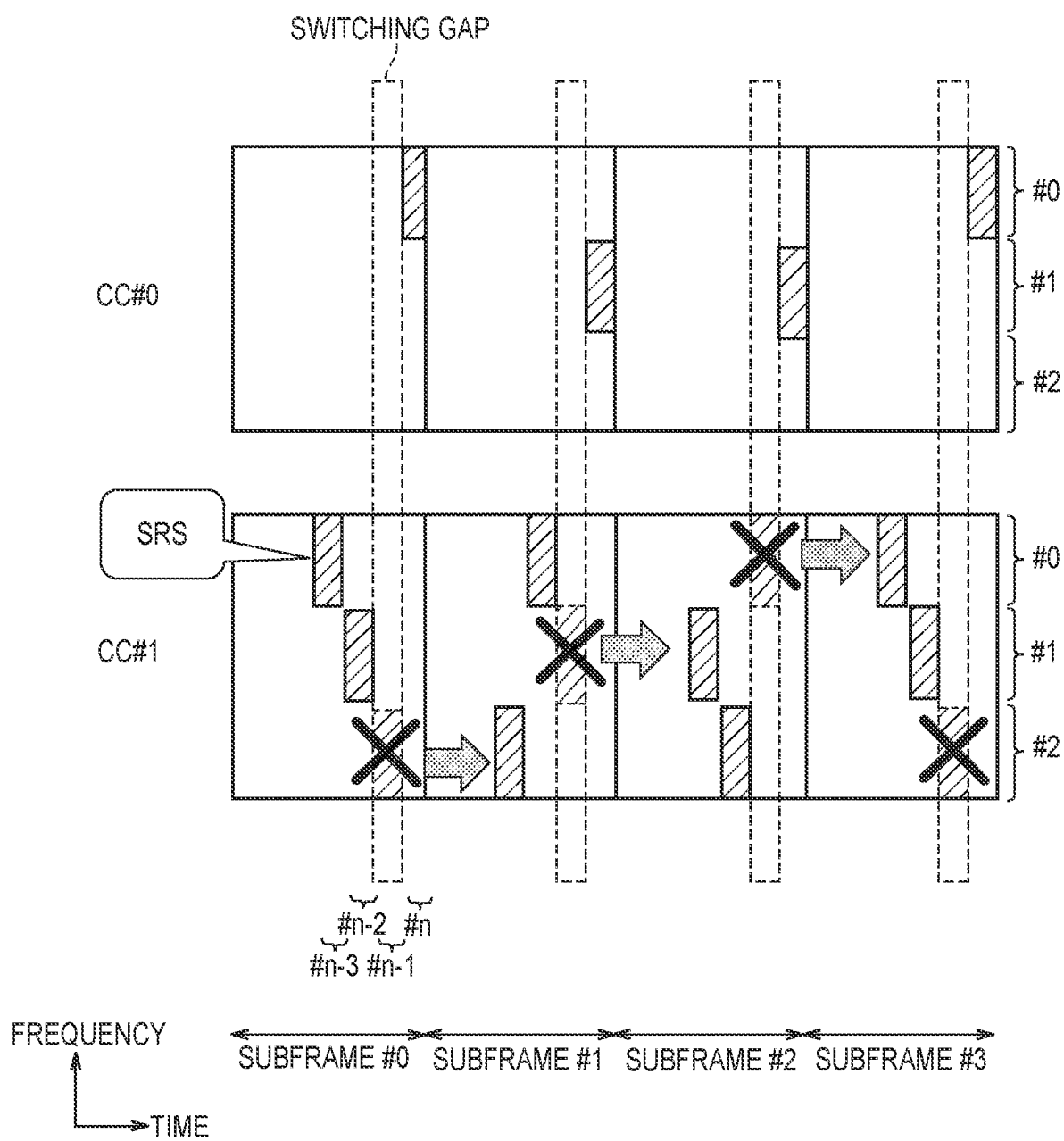

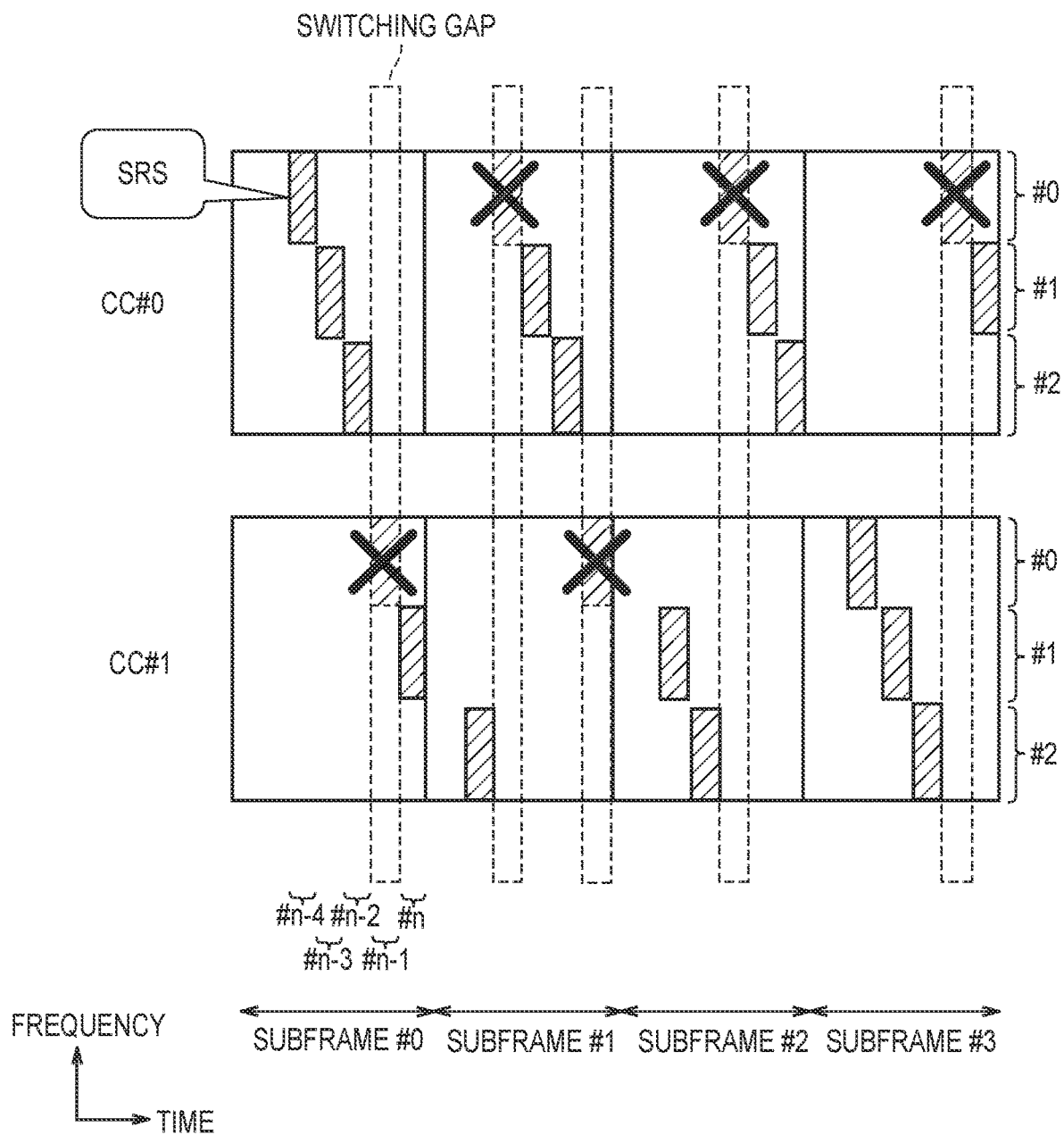

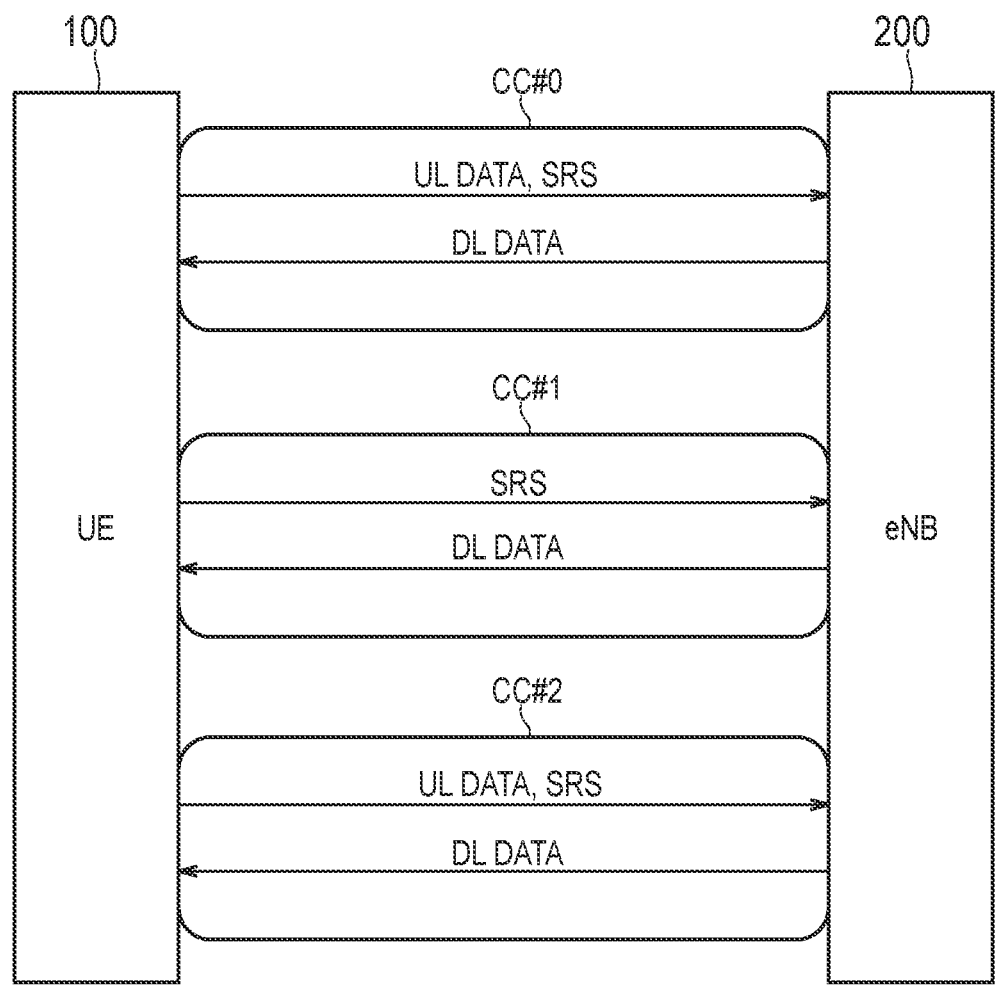

RADIO TERMINAL AND BASE STATION

CROSS-REFERENCE TO RELATED APPLICATION

The present application is a continuation based on PCT Application No. PCT/JP2016/072439 filed on Jul. 29, 2016, which claims the benefit of U.S. Provisional Application No. 62/212,024 (filed on Aug. 31, 2015). The content of which is incorporated by reference herein in their entirety.

TECHNICAL FIELD

The present application relates to a radio terminal and a base station used in a mobile communication system.

BACKGROUND ART

In recent years, research and development have been actively conducted to implement a fifth generation mobile communication system with a greatly improved communication capacity and communication speed relative to the current third and fourth generation mobile communication systems.

SUMMARY

A radio terminal according to one embodiment comprises a controller configured to perform radio communication in a time division duplex system, with a base station. The controller is configured to receive a downlink radio signal from the base station; and transmit to the base station, response information indicating whether reception of the downlink radio signal is successful, wherein the response information is transmitted by using an uplink radio resource different from an uplink control channel resource even if the uplink radio resource is not allocated for data transmission from the base station.

A base station according to one embodiment comprises a controller configured to perform radio communication in a time division duplex system, with a radio terminal. The controller is configured to perform a process of transmitting an instruction to the radio terminal so that a specific transmission process is performed. The specific transmission process is a process of transmitting, by the radio terminal, response information to a base station of the radio terminal by using an uplink radio resource overlapping, in a frequency direction, with a downlink resource block allocated from the base station. The response information is information indicating whether reception of a downlink radio signal transmitted by using the downlink resource block is successful.

A radio terminal according to one embodiment comprises: a controller configured to perform radio communication in a time division duplex system, with a base station. The controller is configured to perform: a process of receiving a downlink radio signal from the base station; and a process of transmitting response information indicating whether reception of the downlink radio signal is successful, to the base station, by using an uplink radio resource secured in units of symbols instead of in units of subframes or in unit of slots in a time direction.

A radio terminal according to one embodiment comprises: a controller configured to perform radio communication in a time division duplex system, with a base station. The controller is configured to perform: a process of receiving a downlink radio signal from the base station; and a process of transmitting, to the base station, a reference signal including response information indicating whether reception of the downlink radio signal is successful. The reference signal is a sounding reference signal or a demodulation reference signal.

A radio terminal according to one embodiment comprises a controller configured to perform radio communication in a time division duplex system, with a base station. The controller is configured to perform a process of transmitting an uplink radio signal to the base station while switching a resource block and/or a component carrier used for transmitting the uplink radio signal, in units of predetermined number of symbols instead of in units of subframes or in units of slots.

A base station according to one embodiment comprises a controller configured to perform radio communication with a radio terminal. The controller is configured to perform a process of receiving a random access preamble from the radio terminal; and a process of transmitting, to the radio terminal, a random access response corresponding to the random access preamble with a demodulation-use reference signal specific to the radio terminal.

BRIEF DESCRIPTION OF THE DRAWINGS

FIG. 2 is a block diagram of a UE (radio terminal).

FIG. 3 is a block diagram of an eNB (base station).

FIGS. 7A and 7B are diagrams illustrating an example of a method of estimating downlink CSI by utilizing reversibility of uplink and downlink channels according to a first embodiment.

FIGS. 8A to 8C are diagrams illustrating an example of ACK/NACK transmission by using an SRS resource according to the first embodiment.

FIG. 10 is a sequence diagram illustrating an example of an operation sequence according to the first embodiment.

FIG. 11 is a diagram illustrating an example of an operation according to a second embodiment.

FIG. 12 is a diagram illustrating an example of a CC individual setting according to a first modification of the second embodiment.

FIG. 13 is a diagram illustrating an example of a multiple CCs collective setting according to the first modification of the second embodiment.

FIG. 15 is a first diagram illustrating a third modification of the second embodiment.

DESCRIPTION OF THE EMBODIMENT

Overview of the Embodiments

Figure 1:
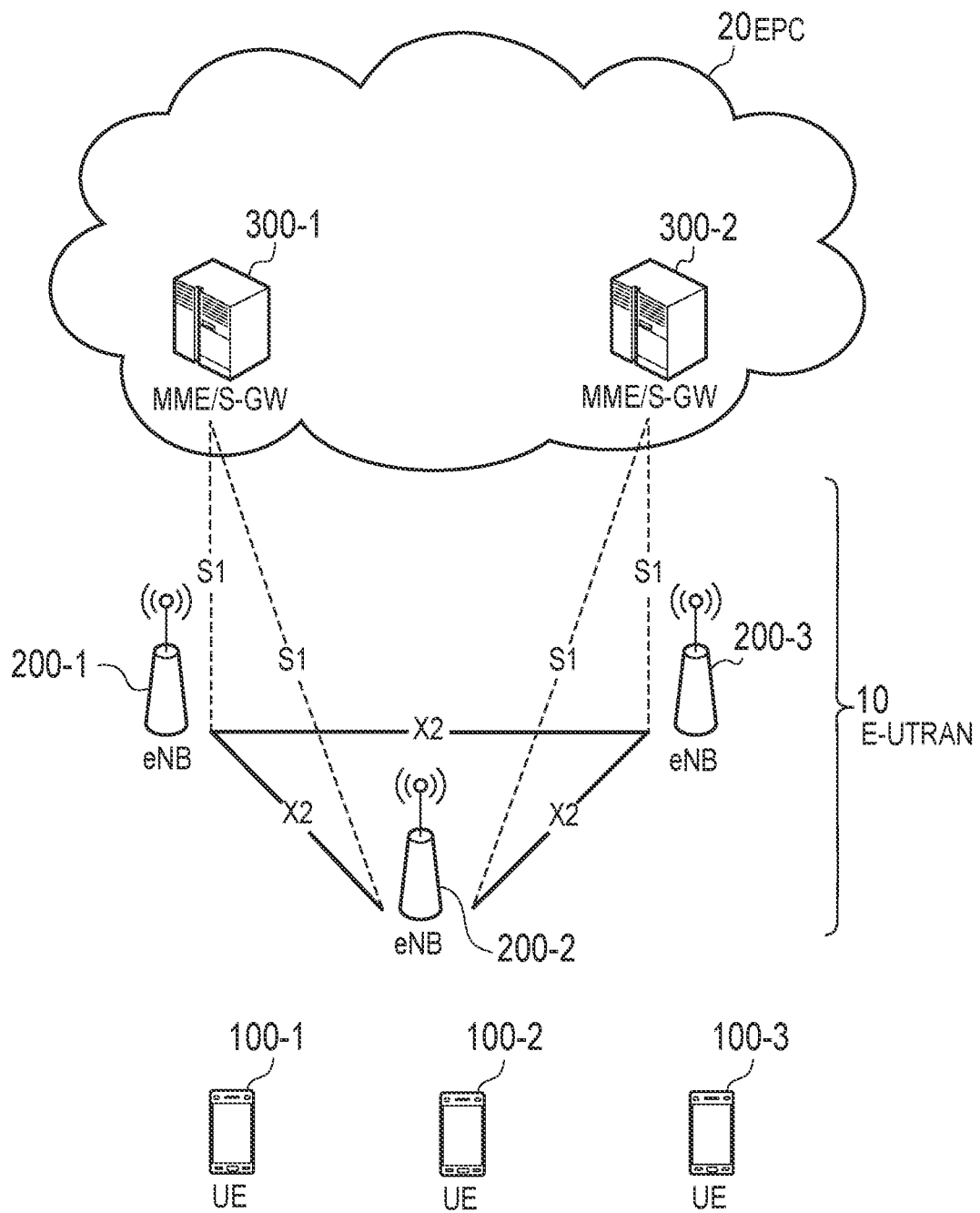
FIG. 1 is a diagram illustrating a configuration of an LTE system (mobile communication system).

A radio terminal according to a first embodiment comprises a controller configured to perform radio communication in a time division duplex system, with a base station. The controller is configured to perform: a process of receiving a downlink radio signal from the base station; and a specific transmission process of transmitting response information indicating whether reception of the downlink radio signal is successful, by using an uplink radio resource different from an uplink control channel resource, to the base station, even if the uplink radio resource is not allocated for data transmission from the base station.

In the first embodiment, the controller is configured to use a downlink resource block allocated from the base station to receive the downlink radio signal in the receiving process, and to use an uplink radio resource overlapping, in a frequency direction, with the downlink resource block to transmit the response information, in the specific transmission process.

In the first embodiment, the specific transmission process may include a process of specifying the uplink radio resource used for transmitting the response information, in units of symbols instead of in units of subframes or in unit of slots, in a time direction.

In the first embodiment, the controller may perform the specific transmission process, based on an instruction from the base station.

In the first embodiment, the instruction from the base station may include information for designating the uplink radio resource for transmitting the response information.

In the first embodiment, the uplink radio resource includes a sounding reference signal resource. The specific transmission process may include a process of transmitting the sounding reference signal including the response information to the base station, by using the sounding reference signal resource overlapping, in the frequency direction, with the downlink resource block.

In the first embodiment, the response information indicates whether reception of the downlink radio signal is successful by a signal sequence of the sounding reference signal or a resource arrangement pattern of the sounding reference signal.

In the first embodiment, the specific transmission process includes a process of transmitting the sounding reference signal including the response information to the base station, by using a plurality of subcarriers. In the plurality of subcarriers, a frequency interval equivalent to two or more subcarriers may be arranged.

In the first embodiment, the uplink radio resource includes a physical uplink shared channel resource. The specific transmission process may include a process of transmitting a demodulation reference signal different from the response information or a demodulation reference signal including the response information, by using the physical uplink shared channel resource overlapping, in the frequency direction, with the downlink resource block.

A base station according to the first embodiment comprises a controller configured to perform radio communication in a time division duplex system, with a radio terminal. The controller is configured to perform a process of transmitting an instruction to the radio terminal so that a specific transmission process is performed. The specific transmission process is a process of transmitting, by the radio terminal, response information to a base station of the radio terminal by using an uplink radio resource overlapping, in a frequency direction, with a downlink resource block allocated from the base station. The response information is information indicating whether reception of a downlink radio signal transmitted by using the downlink resource block is successful.

A radio terminal according to the first embodiment comprises: a controller configured to perform radio communication in a time division duplex system, with a base station. The controller is configured to perform: a process of receiving a downlink radio signal from the base station; and a process of transmitting response information indicating whether reception of the downlink radio signal is successful, to the base station, by using an uplink radio resource secured in units of symbols instead of in units of subframes or in unit of slots in a time direction.

A radio terminal according to the first embodiment comprises: a controller configured to perform radio communication in a time division duplex system, with a base station. The controller is configured to perform: a process of receiving a downlink radio signal from the base station; and a process of transmitting, to the base station, a reference signal including response information indicating whether reception of the downlink radio signal is successful. The reference signal is a sounding reference signal or a demodulation reference signal.

A radio terminal according to a second embodiment comprises a controller configured to perform radio communication in a time division duplex system, with a base station. The controller is configured to perform a process of transmitting an uplink radio signal to the base station while switching a resource block and/or a component carrier used for transmitting the uplink radio signal, in units of predetermined number of symbols instead of in units of subframes or in units of slots.

In the second embodiment, the predetermined number may be a number smaller than a symbol number configuring one slot interval.

In the second embodiment, in response to a plurality of component carriers being set to the radio terminal from the base station, the controller may perform a process of transmitting the uplink radio signal to the base station while switching, in units of the predetermined number of symbols, a component carrier used for transmitting the uplink radio signal, within the range of the plurality of component carriers.

In the second embodiment, the controller is configured to provide a switching gap equivalent to one or a plurality of symbols, between transmission on a component carrier before switching and transmission on a component carrier after switching. Further, in order to compensate for a time gap for switching the component carrier, it may provide a time gap equivalent to a predetermined number of symbols between transmission on the component carrier before the switching and transmission on the component carrier after the switching.

A base station according to a third embodiment comprises a controller configured to perform radio communication with a radio terminal. The controller is configured to perform a process of receiving a random access preamble from the radio terminal; and a process of transmitting, to the radio terminal, a random access response corresponding to the random access preamble with a demodulation-use reference signal specific to the radio terminal.

In the third embodiment, the controller may perform a process of deriving a downlink transmission weight for the radio terminal, based on a channel estimation result using the random access preamble; and a process of transmitting, to the radio terminal, the demodulation-use reference signal specific to the radio terminal with the random access response by using the downlink transmission weight.

In the third embodiment, a downlink resource block used for transmitting the random access response may overlap, in a frequency direction, with an uplink resource block used for transmitting the random access preamble.

In the third embodiment, the controller may perform a process of transmitting the random access response to the radio terminal without transmitting allocation information of the downlink resource block to the radio terminal.

Overview of Mobile Communication System

An overview of an LTE (Long Term Evolution) system which is a mobile communication system according to the embodiment will be described below. The LTE system is a mobile communication system whose specifications are formulated in 3rd Generation Partnership Project (3GPP).

Configuration of Mobile Communication System

Firstly, an LTE system which is a mobile communication system according to the embodiments will be described. FIG. 1 is a configuration diagram of an LTE system. As illustrated in FIG. 1, the LTE (Long Term Evolution) system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with eNB 200.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereafter, referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Configuration of Radio Terminal

Next, the configuration of the UE 100 (radio terminal) will be described. FIG. 2 is a block diagram of the UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130. The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may include a codec that performs encoding and decoding on sound and video signals. The processor executes the above-described processes and below-described processes.

Configuration of Base Station

Next, the configuration of the eNB 200 (base station) will be described. FIG. 3 is a block diagram of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna. The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes the above-described processes and below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

Configuration of Radio Interface

Figure 4:
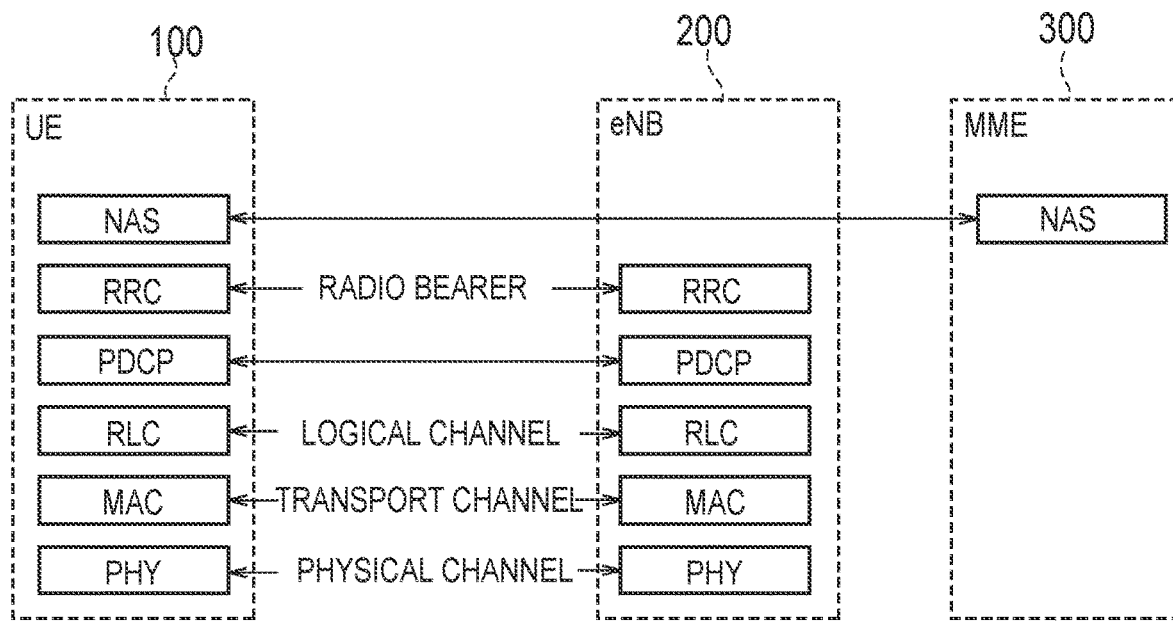
FIG. 4 is a protocol stack diagram of a radio interface in the LTE system.

Next, the configuration of the radio interface in the LTE system will be described. FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), a random access procedure, and the like. Between the MAC layer of the UE 100 and the MAC layer of the eNB 200, user data and control information are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, messages (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Overview of Lower Layer of LTE

Figure 5:
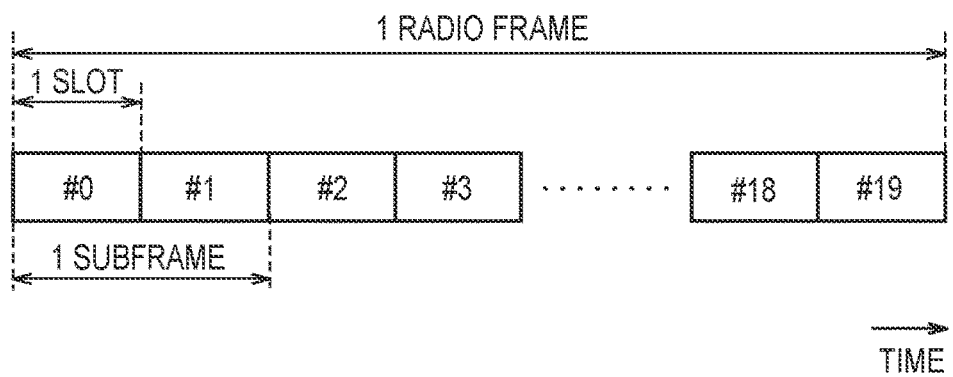
FIG. 5 is a configuration diagram of a radio frame used in the LTE system.

Next, the overview of lower layer of LTE will be described. FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control information. The details of the PDCCH will be described later. Furthermore, the other portion of each subframe is a region available as a physical downlink shared channel (PDSCH) for mainly transmitting downlink data.

The eNB 200 uses the PDCCH to transmit downlink control information (DCI) to the UE 100, and uses the PDSCH to transmit downlink data to the UE 100. The downlink control information carried on the PDCCH includes uplink SI (Scheduling Information), downlink SI, and a TPC bit. The uplink SI is scheduling information related to an allocation of an uplink radio resource (UL grant), and the downlink SI is scheduling information related to an allocation of a downlink radio resource. The TPC bit is information for instructing an increase or decrease in the uplink transmission power. In order to identify a UE 100 to which the downlink control information is transmitted, the eNB 200 includes, into the downlink control information, a CRC bit scrambled with an identifier (RNTI: Radio Network Temporary ID) of the UE 100 to which the downlink control information is transmitted. Each UE 100 performs blind decoding of the PDCCH for the downlink control information that may be addressed to the UE 100 to detect the downlink control information addressed to the UE 100. The PDSCH carries the downlink data by the downlink radio resource (resource block) indicated by the downlink SI.

In the uplink, both ends in the frequency direction of each subframe are regions used as a physical uplink control channel (PUCCH) for mainly transmitting the uplink control information. The remaining portion of each subframe is a region that can be used as a physical uplink shared channel (PUSCH) for mainly transmitting uplink data.

Basically, the UE 100 uses the PUCCH to transmit uplink control information (UCI) to the eNB 200, and uses the PUSCH to transmit the uplink data to the eNB 200. However, if a PUSCH allocation is provided, the UE 100 may use the PUSCH to transmit the uplink control information to the eNB 200. The uplink control information carried on the PUCCH may include a CQI (Channel Quality Indicator), a PMI (Precoding Matrix Indicator), an RI (Rank Indicator), a scheduling request (SR), and an HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) that can be used for the downlink transmission. The SR is information for requesting an allocation of a PUSCH resource. The HARQ ACK/NACK is response information indicating whether or not the reception of the downlink data has been successful.

Uplink Reference Signal

Next, an uplink reference signal will be described. The UE 100 transmits a reference signal to the eNB 200. The eNB 200 performs estimation of uplink channel characteristic (channel estimation), based on the reference signal received from the UE 100.

Figure 6:
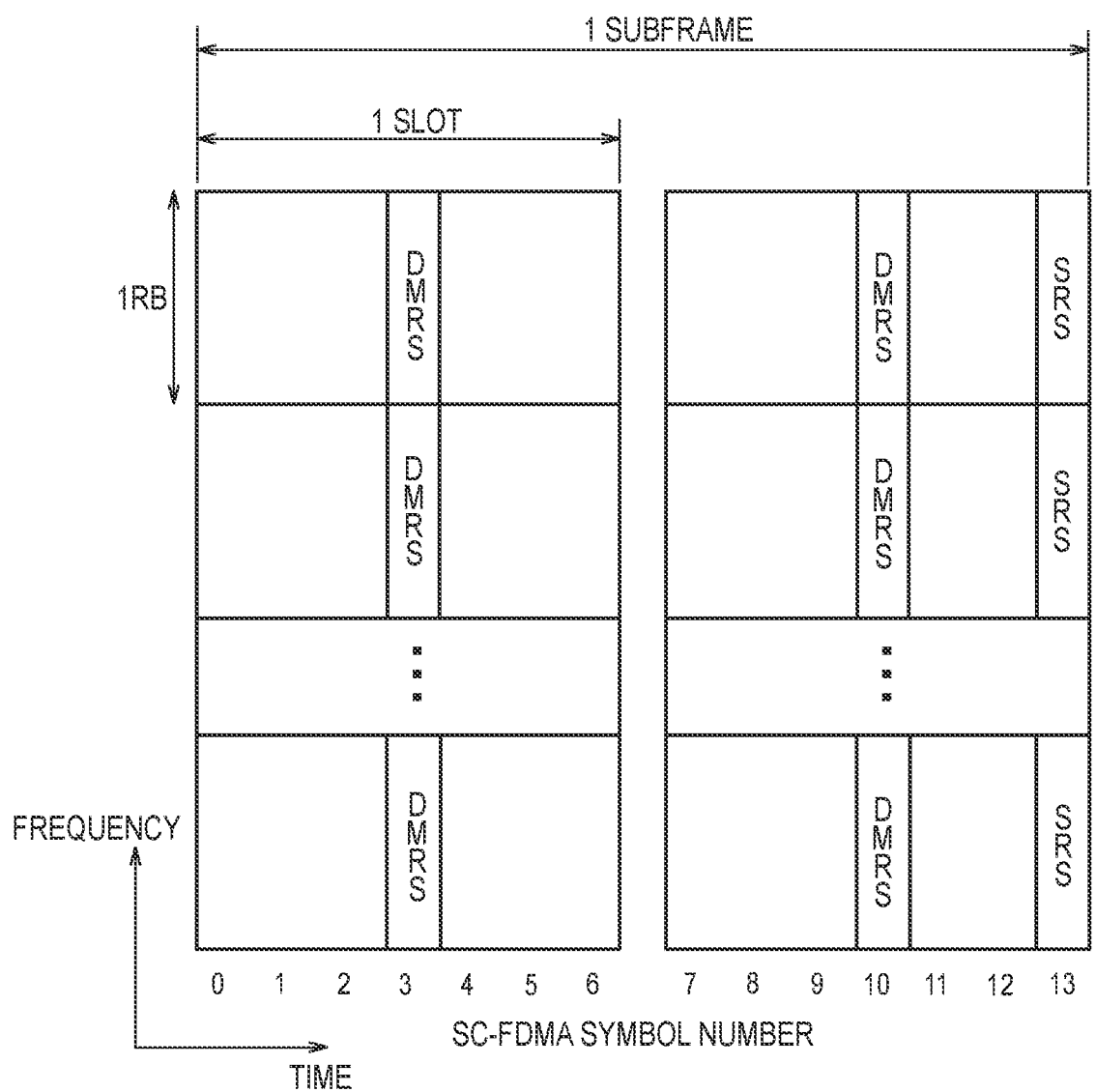
FIG. 6 is a diagram illustrating an example of a reference signal included in one uplink subframe.

FIG. 6 is a diagram illustrating an example of a reference signal included in one uplink subframe. It is noted that in FIG. 6, although a first half slot and a second half slot are illustrated separately, the first half slot and the second half slot are, actually, contiguous.

As illustrated in FIG. 6, a sounding reference signal (SRS) is arranged in the last SC-FDMA symbol (symbol number 13) of one subframe. The UE 100 transmits the SRS to the eNB 200, based on setting information notified from the eNB 200 by RRC signaling. The eNB 200 performs a channel estimation based on the SRS received from the UE 100 and performs uplink scheduling and the like, based on the channel estimation result.

Further, a demodulation reference signal (DMRS) is arranged in one SC-FDMA symbol in the middle (symbol numbers 3 and 10) of each slot. The UE 100 transmits the DMRS in a resource block (RB) equivalent to a PUSCH resource allocated from the eNB 200. That is, the UE 100 transmits the DMRS when performing the PUSCH transmission. The eNB 200 performs the channel estimation based on the SRS received from the UE 100 and performs demodulation of the PUSCH and the like, based on the channel estimation result.

Fifth Generation Mobile Communication System

Next, an overview of the fifth generation mobile communication system will be described. To realize the fifth generation mobile communication system, "utilization of a high frequency band", "utilization of a small cell", and "Massive MIMO (Multi-Input Multi-Output)" are considered to be important. The "utilization of a high frequency band" is a technology by which a wide frequency bandwidth is secured by utilizing a frequency band higher than the current frequency band. The "utilization of a small cell" is a technology by which throughput of a local high traffic area is improved while compensating for large propagation loss in a high frequency band. The "Massive MIMO" is a technology by which advanced multi-antenna transmission is enabled by using a large number of antenna elements while taking advantage of enabling miniaturization of antenna elements in a high frequency band.

Further, in the fifth generation mobile communication system, a time division duplex (TDD) system is considered to be important mainly due to the following two reasons.

First, although a guard time is needed in the TDD system to compensate for propagation delay, the "utilization of a small cell" allows having a shorter guard time.

Second, the TDD system can utilize the reversibility of the uplink and downlink channels, and thus, the eNB 200 can estimate downlink channel state information (CSI), based on an uplink radio signal (specifically, a reference signal) from the UE 100. The downlink CSI is a CQI, a PMI, an RI, and the like. For example, the eNB 200 receives a DMRS accompanying the PUSCH transmission of the UE 100, uses the DMRS to estimate the downlink CSI, and performs the PDSCH transmission based on the downlink CSI. Therefore, according to the TDD system, it is possible to obtain highly accurate CSI needed for the "Massive MIMO" with low overhead. That is, it is possible to eliminate a need of providing (to reduce) the downlink CSI to be fed back from the UE 100 to the eNB 200.

First Embodiment

A first embodiment will be described, below. In the first embodiment, the UE 100 and the eNB 200 perform radio communication of the TDD system. The first embodiment is an embodiment allowing for efficient estimation of the downlink CSI in a case of estimating the downlink CSI by utilizing the reversibility of the uplink and downlink channels.

FIGS. 7A and 7B are diagrams illustrating an example of a method of estimating the downlink CSI by utilizing the reversibility of the uplink and downlink channels. Here, a case is assumed where a DMRS is used for channel estimation.

In an example illustrated in FIG. 7A, an uplink (UL) duration is configured by four uplink subframes, and a downlink (DL) duration is configured by four downlink subframes. Further, Spatial multiplexing is applied to both the uplink and the downlink. On the other hand, in an example illustrated in FIG. 7B, an uplink duration is configured by two uplink subframes, and a downlink duration is configured by four downlink subframes. Further, Spatial multiplexing is applied to the uplink.

As illustrated in FIGS. 7A and 7B, to utilize the channel reversibility, it is necessary to appropriately set and allocate the same amount of uplink radio resources to the UE 100, as that of the radio resources used for the downlink (the resource block and the component carrier). Although dependent on a fluctuating velocity of the channel, it is necessary to maintain a time period it takes from the uplink communication to the downlink communication within a half radio frame (5 ms) or within one radio frame (10 ms), for example.

Therefore, before allocating a downlink resource block (PDSCH resource) to a certain UE 100, the eNB 200 allocates an uplink resource block (PUSCH resource) that matches, in a frequency direction, with the downlink resource block to the certain UE 100.

However, in general, the uplink data is less than the downlink data, and thus, it is difficult to allocate, to the identical UE 100, the uplink radio resource having the similar amount to the downlink radio resource. Specifically, the number of the resource blocks to be allocated to the UE 100 by the eNB 200 may be fewer in the uplink than in the downlink. Further, due to a radio frame configuration of the TDD, the number of uplink subframes may be fewer than the number of downlink subframes.

Overview of First Embodiment

Next, an overview of the first embodiment will be described.

In the first embodiment, the eNB 200 uses a downlink resource block allocated to the UE 100 to transmit a downlink radio signal to the UE 100. The UE 100 uses the downlink resource block (hereinafter, "allocated DL RB") allocated from the eNB 200 to receive the downlink radio signal from the eNB 200. Here, the allocated DL RB is an RB used as PDSCH, and the downlink radio signal is downlink data. Alternatively, the allocated DL RB is an RB used as ePDCCH (enhanced PDCCH), and the downlink radio signal may be downlink control information.

The UE 100 uses an uplink radio resource overlapping, in the frequency direction, with the allocated DL RB to perform a specific transmission process for transmitting, to the eNB 200, response information indicating whether or not the reception of the downlink radio signal is successful. The eNB 200 uses the uplink radio resource overlapping, in the frequency direction, with the allocated DL RB to receive, from the UE 100, the response information indicating whether or not the reception of the downlink radio signal is successful. If a plurality of component carriers (TDD carriers) are set to the UE 100, the UE 100 may perform the specific transmission process for each of the plurality of component carriers.

Here, "overlapping" does not require that the uplink radio resource used for transmitting the response information completely matches, in the frequency direction, with the allocated DL RB. The uplink radio resource used for transmitting the response information may only need to include the allocated DL RB in the frequency direction. The response information is an HARQ ACK/NACK, and hereinafter, it is simply referred to as "ACK/NACK".

Further, in a general LTE system, the UE 100 transmits the ACK/NACK on the PUCCH irrespective of a frequency position of the allocated DL RB, as long as no PUSCH resource allocation is provided. Further, in a general LTE system, the UE 100 transmits the ACK/NACK on the PUSCH irrespective of the frequency position of the allocated DL RB, even if a PUSCH resource allocation is provided.

On the other hand, in the first embodiment, the UE 100 uses the uplink radio resource corresponding to the frequency position of the allocated DL RB to transmit the ACK/NACK. The transmission timing of the ACK/NACK may be similar to that of the general LTE system. The transmission timing of the ACK/NACK in the LTE system of the TDD system depends on the radio frame configuration of the TDD.

In this manner, the first embodiment focuses on an uplink ACK/NACK being generated upon allocating the downlink resource block and utilizes the ACK/NACK for channel estimation. As a result, a sufficient amount of uplink radio resources can be secured for channel estimation. Therefore, it is possible to efficiently estimate downlink CSI in a case of estimating the downlink CSI by utilizing the reversibility of the uplink and downlink channels.

In the first embodiment, the specific transmission process may include a process of specifying, in the time direction, the uplink radio resource used for transmitting the ACK/NACK in units of symbols (units of SC-FDMA symbols) instead of in units of subframes or in units of slots. The uplink radio resource used for transmitting the ACK/NACK is secured by the eNB 200. The eNB 200 transmits, to the UE 100, an instruction including information for designating the uplink radio resource for transmitting the ACK/NACK. The eNB 200 may transmit, to the UE 100, information for designating the SC-FDMA symbol used for transmitting the ACK/NACK by RRC signaling, for example. When the uplink radio resource to be used for transmitting the ACK/NACK is secured and specified in units of symbols, it is possible to time-division multiplex the ACK/NACK of a plurality of UEs in an identical RB in one slot.

Here, the uplink radio resource to be used for transmitting the ACK/NACK is an SRS resource or a PUSCH resource. If the SRS resource is used to transmit the ACK/NACK, for example, the last one SC-FDMA symbol of the uplink subframe is secured. On the other hand, if the PUSCH resource is used to transmit the ACK/NACK, for example, a plurality of contiguous SC-FDMA symbols are secured.

In the first embodiment, the UE 100 may use the uplink radio resource different from the PUCCH resource to perform the specific transmission process, based on an instruction from the eNB 200, even if the uplink radio resource (PUSCH resource) for the data transmission is not allocated from the eNB 200. The instruction from the eNB 200 is performed by using the RRC signaling or the PDCCH, for example. As a result, the UE 100 can transmit the ACK/NACK to the eNB 200 even if the UE 100 does not have the uplink data and the PUSCH resource is not allocated from the eNB 200. It is noted that the instruction from the eNB 200 includes information for designating the uplink radio resource for transmitting the ACK/NACK.

ACK/NACK Transmission by Using SRS Resource According to First Embodiment

Next, ACK/NACK transmission by using an SRS resource according to the first embodiment will be described. The UE 100 uses an SRS resource overlapping, in the frequency direction, with the allocated DL RB to transmit an SRS including the ACK/NACK to the eNB 200. FIGS. 8A to 8C are diagrams illustrating an example of the ACK/NACK transmission by using the SRS resource according to the first embodiment.

In examples illustrated in FIG. 8A and FIG. 8C, a plurality of subcarriers used for transmitting one SRS are provided with a frequency interval equivalent to one subcarrier. For example, an SRS #0 is transmitted by using an even numbered subcarrier (referred to as "Transmission Comb 0") and an SRS #1 is transmitted by using an odd numbered subcarrier (referred to as "Transmission Comb 1"). Such SRS subcarrier arrangement is similar to that of a general LTE system. When using such SRS subcarrier arrangement, two SRSs can be multiplexed by frequency division.

On the other hand, in an example illustrated in FIG. 8B, a plurality of subcarriers used for transmitting one SRS are provided with a frequency interval equivalent to two or more subcarriers (specifically, three subcarriers). If such SRS subcarrier arrangement is used, four SRSs (SRSs #0 to #3) can be multiplexed by frequency division.

Further, in examples illustrated in FIG. 8A and FIG. 8B, the ACK/NACK is indicated by a signal sequence of the SRS. The signal sequence for the ACK and the signal sequence of the NACK may be set in advance by the system specification or may be set by the eNB 200 to the UE 100. If not successfully receiving (decoding) the downlink data from the eNB 200, the UE 100 transmits the SRS to the eNB 200 by using the signal sequence for the NACK. The eNB 200 uses the SRS received from the UE 100 to perform the channel estimation, and determines based on the signal sequence that the UE 100 has failed to receive the downlink data. In this case, the eNB 200 may perform a retransmission process by HARQ. On the other hand, if successfully receiving (decoding) the downlink data from the eNB 200, the UE 100 transmits the SRS to the eNB 200 by using the signal sequence for the ACK. The eNB 200 uses the SRS received from the UE 100 to perform the channel estimation, and determines based on the signal sequence that the UE 100 has normally received the downlink data.

On the other hand, in an example illustrated in FIG. 8C, an SRS resource arrangement pattern (specifically, a subcarrier arrangement pattern) indicates the ACK/NACK (or means the ACK/NACK). For example, the even numbered subcarrier (Transmission Comb 0) indicates the ACK and the odd numbered subcarrier (Transmission Comb 1) indicates the NACK. A correspondence relationship between the ACK/NACK and the subcarrier arrangement pattern may be set in advance by the system specification or may be set by the eNB 200 to the UE 100. If not successfully receiving (decoding) the downlink data from the eNB 200, the UE 100 uses the subcarrier arrangement pattern for the NACK to transmit the SRS to the eNB 200. The eNB 200 uses the SRS received from the UE 100 to perform the channel estimation and determines based on the subcarrier arrangement pattern of the SRS that the UE 100 has failed to receive the downlink data. In this case, the eNB 200 may perform a retransmission process by HARQ. On the other hand, if successfully receiving (decoding) the downlink data from the eNB 200, the UE 100 uses the subcarrier arrangement pattern for the ACK to transmit the SRS to the eNB 200. The eNB 200 uses the SRS received from the UE 100 to perform the channel estimation and determines based on the subcarrier arrangement pattern of the SRS that the UE 100 has normally received downlink data.

ACK/NACK Transmission by Using PUSCH Resource According to First Embodiment

Figure 9A:
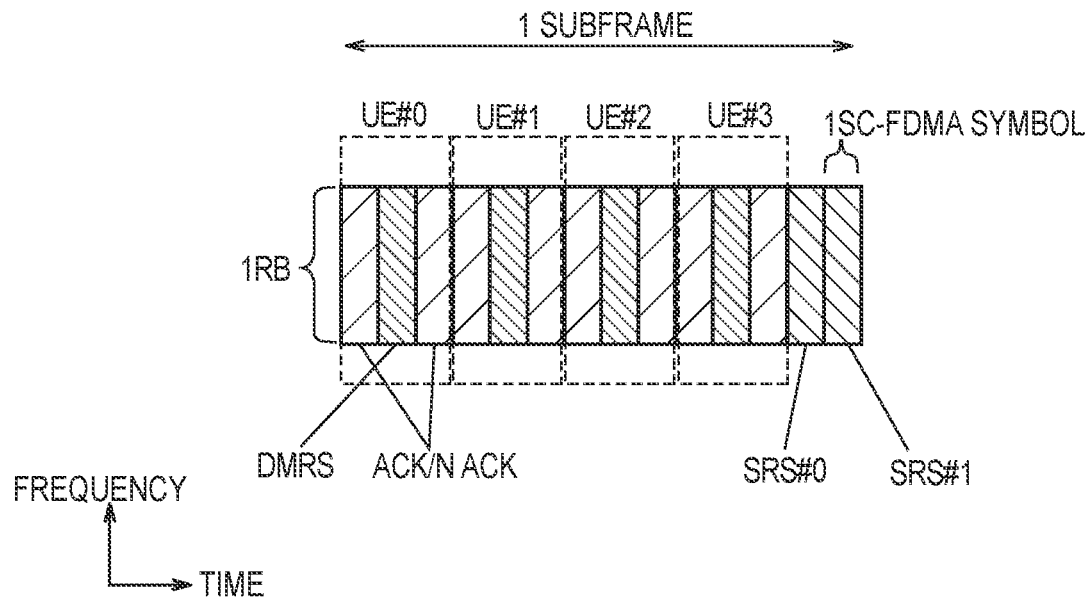
FIGS. 9A to 9C are diagrams illustrating an example of ACK/NACK transmission by using a PUSCH resource according to the first embodiment.
Figure 9B:
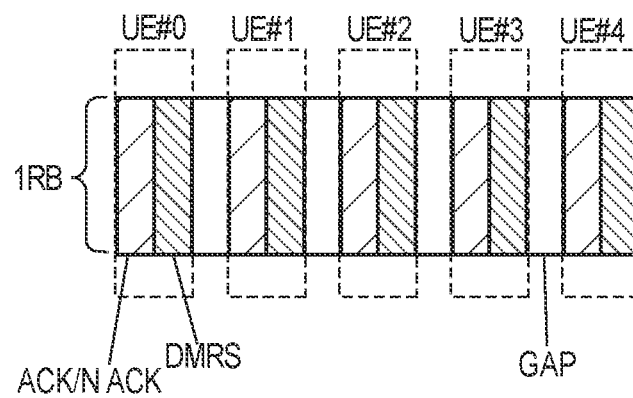
Figure 9C:
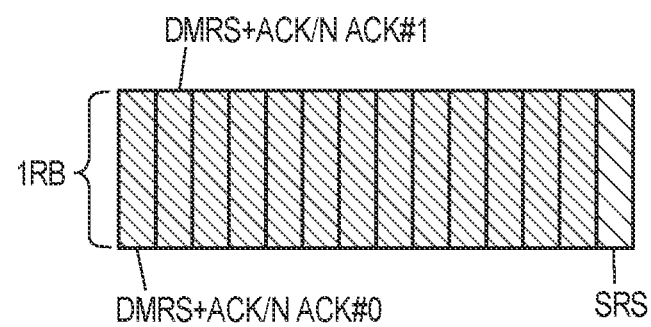

Next, the ACK/NACK transmission by using the PUSCH resource according to the first embodiment will be described. The UE 100 uses the PUSCH resource overlapping, in the frequency direction, with the allocated DL RB to transmit a DMRS different from the ACK/NACK or a DMRS including the ACK/NACK to the eNB 200. FIGS. 9A to 9C are diagrams illustrating an example of the ACK/NACK transmission by using the PUSCH resource according to the first embodiment.

In an example illustrated in FIG. 9A, in one RB and in one sub frame, the ACKs/NACKs of four UEs 100 (a UE #0 to a UE #3) are time-division multiplexed. Specifically, three contiguous SC-FDMA symbols are secured, as an ACK/NACK transmission resource, for every UE 100. For example, the ACK/NACK is arranged in the first and third SC-FDMA symbols of the three contiguous SC-FDMA symbols and the DMRS is arranged in the second SC-FDMA symbol. It is noted that a small amount of uplink data, in addition to the ACK/NACK, may be arranged in the first and third SC-FDMA symbols. Specifically, in the example illustrated in FIG. 9A, the SC-FDMA symbols except for the last two SC-FDMA symbols of the 14 SC-FDMA symbols within one subframe, are secured as resources for the ACK/NACK transmission, and the last two SC-FDMA symbols are secured as the SRS resource.

In an example illustrated in FIG. 9B, in one RB and one subframe, the ACKs/NACKs of five UEs 100 (the UE #0 to a UE #4) are time-division multiplexed. Specifically, two contiguous SC-FDMA symbols are secured, as the ACK/NACK transmission resource, for every UE 100. For example, the ACK/NACK is arranged in the first SC-FDMA symbol of the two contiguous SC-FDMA symbols, and the DMRS is arranged in the second SC-FDMA symbol. It is noted that a small amount of uplink data, in addition to the ACK/NACK, may be arranged in the first SC-FDMA symbol. Further, in the example illustrated in FIG. 9B, a gap interval equivalent to one SC-FDMA symbol is secured between the ACK/NACK transmission resource of one UE 100 and the ACK/NACK transmission resource of another UE 100.

In the examples illustrated in FIG. 9A and FIG. 9B, the UE 100 transmits, after receiving the downlink data from the eNB 200, the ACK/NACK and the DMRS to the eNB 200 by using the ACK/NACK transmission resource designated by the eNB 200, for example. The eNB 200 uses the DMRS received from the UE 100 to perform the channel estimation and demodulates the ACK/NACK, based on the channel estimation result. If the NACK is obtained, the eNB 200 may perform the retransmission process by HARQ.

In the examples illustrated in FIG. 9A and FIG. 9B, the ACKs/NACKs of different UEs 100 are multiplexed within one subframe, however, the ACKs/NACKs of the identical UE 100 may be multiplexed within the one subframe. In this case, one UE 100 can transmit a plurality of ACKs/NACKs within one subframe.

In FIG. 9A and FIG. 9B, the example is described in which the UE 100 transmits the DMRS that comes along with the ACK/NACK. That is, the ACK/NACK is a signal different from the DMRS. On the other hand, in an example illustrated in FIG. 9C, the UE 100 transmits the DMRS including the ACK/NACK to the eNB 200.

Specifically, in the example illustrated in FIG. 9C, the SC-FDMA symbols except for the last SC-FDMA symbol of the 14 SC-FDMA symbols within one subframe are secured as a DMRS transmission resource including the ACK/NACK, and the last SC-FDMA symbol is secured as the SRS resource.

In the example illustrated in FIG. 9C, one DMRS including one ACK/NACK is arranged in one SC-FDMA symbol. Each SC-FDMA symbol in which the DMRS is arranged may be allocated to a different UE 100 or may be allocated to the identical UE 100.

The ACK/NACK may be indicated by the signal sequence of the DMRS. In this case, the signal sequence for the ACK and the signal sequence of the NACK may be set in advance by the system specification or may be set by the eNB 200 to the UE 100. Alternatively, the ACK/NACK may be indicated by a DMRS resource arrangement pattern (specifically, a subcarrier arrangement pattern). In this case, a correspondence relationship between the ACK/NACK and the subcarrier arrangement pattern may be set in advance by the system specification or may be set by the eNB 200 to the UE 100.

Here, a case is assumed where the ACK/NACK is indicated by the signal sequence of the DMRS. If not successfully receiving (decoding) the downlink data from the eNB 200, the UE 100 transmits the DMRS to the eNB 200 by using the signal sequence for the NACK. The eNB 200 uses the DMRS received from the UE 100 to perform the channel estimation and determines based on the signal sequence of the DMRS that the UE 100 has failed to receive the downlink data. In this case, the eNB 200 may perform a retransmission process by HARQ. On the other hand, if successfully receiving (decoding) the downlink data from the eNB 200, the UE 100 transmits the DMRS to the eNB 200 by using the signal sequence for the ACK. The eNB 200 uses the DMRS received from the UE 100 to perform the channel estimation and determines based on the signal sequence of the DMRS that the UE 100 has normally received the downlink data.

Operation Sequence According to First Embodiment

Next, an example of an operation sequence according to the first embodiment will be described. FIG. 10 is a sequence diagram illustrating an example of the operation sequence according to the first embodiment. In an initial state in FIG. 10, the UE 100 is in an RRC connected mode in a cell of the eNB 200.

As illustrated in FIG. 10, in step S101, the eNB 200 transmits setting information by RRC signaling, to the UE 100. The setting information includes various types of parameters related to the specific transmission process according to the first embodiment. For example, the setting information may include information for instructing the UE 100 to perform the specific transmission process according to the first embodiment. Further, the setting information may include information for designating the SC-FDMA symbol (ACK/NACK transmission resource) to be used for transmitting the ACK/NACK. Moreover, the setting information may include information on the signal sequence of the ACK/NACK or information on the subcarrier arrangement pattern of the ACK/NACK. Such setting information as mentioned above may be at least partly transmitted during a PDCCH transmission (step S102) described later. The UE 100 stores the setting information received from the eNB 200.

In step S102, the eNB 200 transmits, to the UE 100, downlink control information (DCI) on the PDCCH. The DCI includes downlink SI being scheduling information including the allocated DL RB. Here, a case is assumed where an RB #1 is designated as the allocated DL RB. The DCI may include information for instructing the UE 100 to perform a specific transmission process according to the first embodiment. Alternatively, a new DCI format for the specific transmission process according to the first embodiment may be used. In this case, in response to reception of the new DCI format, the UE 100 may recognize that the specific transmission process is instructed. The DCI may not include the downlink SI (an UL grant) on allocation of the PUSCH resource. The UE 100 decodes the received DCI.

In step S103, the eNB 200 transmits, to the UE 100, downlink data on the PDSCH. In this case, the RB #1 being the allocated DL RB is used as the PDSCH resource. Based on the downlink SI in the DCI, the UE 100 receives the downlink data transmitted by using the RB #1. If successfully receiving the downlink data, the UE 100 generates an ACK, and if not successfully receiving the downlink data, the UE 100 generates a NACK.

In step S104, based on the setting information and/or the DCI, the UE 100 uses the uplink radio resource (RB #1) overlapping, in the frequency direction, with the allocated DL RB (RB #1) to perform a specific transmission process for transmitting the ACK/NACK to the eNB 200. As mentioned above, the uplink radio resource, which is secured in units of SC-FDMA symbols, is an SRS resource or a PUSCH resource. Here, the UE 100 transmits the ACK/NACK to the eNB 200, even if a PUSCH resource is not explicitly allocated from the eNB 200, that is, if a UL grant is not received. The eNB 200 receives the ACK/NACK.

In step S105, the eNB 200 estimates DL CSI for the RB #1, based on the reference signal (SRS, DMRS) including the ACK/NACK or the reference signal (DMRS) different from the ACK/NACK. Specifically, based on an uplink channel estimation result using the reference signal, the eNB 200 estimates the DL CSI by utilizing the channel reversibility. The DL CSI estimation may include a process for deriving a downlink transmission weight (precoder) for the UE 100.

Operations in step S106 to step S109 are similar to those in step S102 to step S105. It is noted that in step S106, the eNB 200 transmits, to the UE 100, the DCI designating the RB #1 as the allocated DL RB. In steps S106 and S107, the eNB 200 performs control for the PDSCH transmission, based on the DL CSI obtained in step S105. For example, the eNB 200 uses the downlink transmission weight (precoder) to transmit the downlink data to the UE 100. The eNB 200 may perform MIMO transmission by Massive MIMO. Further, in step S106 and later, the eNB 200 may allocate an RB different from the RB #1, based on the DL CSI estimation in step S105 and earlier.

Second Embodiment

A second embodiment will be described while focusing on a difference from the first embodiment, below. The second embodiment is similar to the first embodiment, in that the efficient downlink CSI estimation is enabled in a case where the downlink CSI is estimated by utilizing the reversibility of the uplink and downlink channels.

The UE 100 according to the second embodiment performs radio communication of the TDD system with the eNB 200. The UE 100 transmits an uplink radio signal to the eNB 200, while switching the resource block and/or the component carrier used for transmitting the uplink radio signal, in units of predetermined number of symbols, instead of in units of subframes or in units of slots. The predetermined number may be smaller than the number of symbols (for example "seven") included in one slot interval. In other words, while performing transmission per SC-FDMA symbol in a narrow frequency bandwidth, the UE 100 performs the transmission in a wide frequency bandwidth when viewed from one entire subframe. The eNB 200 receives from the UE 100 the uplink radio signal transmitted while switching the resource block or the component carrier in units of symbols. Based on the uplink radio signal received from the UE 100, the eNB 200 estimates the downlink CSI by utilizing the channel reversibility.

FIG. 11 is a diagram illustrating an example of an operation according to the second embodiment. As illustrated in FIG. 11, each UE 100 transmits the uplink radio signal to the eNB 200, while switching the resource block and/or the component carrier used for transmitting the uplink radio signal, in units of predetermined number of symbols (units of SC-FDMA symbols). In FIG. 11, a switching in units of one symbol (units of one SC-FDMA symbol) is illustrated.

That is, the UE 100 transmits, to the eNB 200, the uplink radio signal through frequency hopping in units of symbols. Here, the "uplink radio signal" may be uplink data (PUSCH transmission) or an SRS. In a case of the uplink data (PUSCH transmission), a DMRS may be arranged in some resource elements included in an SC-FDMA symbol interval where the uplink data is arranged.

In one slot interval, each UE 100 may transmit the uplink radio signal to the eNB 200, while switching the resource block and/or the component carrier used for transmitting the uplink radio signal, in units of predetermined number of symbols.

Further, if a plurality of downlink resource blocks within one component carrier are allocated from the eNB 200 to the UE 100, each UE 100 may transmit the uplink radio signal to the eNB 200, while switching the uplink resource block used for transmitting the uplink radio signal, in units of predetermined number of symbols, within a range of a plurality of uplink resource blocks overlapping, in the frequency direction, with the plurality of downlink resource blocks.

Moreover, if a plurality of component carriers are set to the UE 100 from the eNB 200, the UE 100 may transmit the uplink radio signal to the eNB 200, while switching, in units of predetermined number of symbols, the component carrier used for transmitting the uplink radio signal, within a range of the plurality of component carriers. Here, the "component carrier being set to the UE 100" may mean that the component carrier is set to the UE 100 as an uplink component carrier (UL CC) in carrier aggregation. Alternatively, the "component carrier being set to the UE 100" may mean that the component carrier is set to the UE 100 as an SRS component carrier (SRS CC) for SRS transmission.

If performing switching between the component carriers, a gap interval equivalent to about one SC-FDMA symbol may be provided between transmission in one component carrier and transmission in another component carrier. That is, in order to compensate for a time gap for switching the component carrier, transmission is stopped for a time period equivalent to a predetermined number of symbols between transmission on the component carrier before the switching and transmission on the component carrier after the switching.

If performing switching between the component carriers, the UE 100 may transmit the uplink radio signal to the eNB 200, while switching, in units of predetermined number of symbols, the component carrier used for transmitting the uplink radio signal, so that a transmission timing on the plurality of component carriers does not overlap. As a result, under a premise that the UE 100 cannot perform simultaneous transmission on a plurality of component carriers, the eNB 200 can perform CSI estimation for the plurality of component carriers within a short period of time. Further, it is possible to switch between the component carriers in consideration of a switching time period of the UE 100 (specifically, a time period required for a frequency switching of a radio transmitter) during a change of transmission component carriers.

The eNB 200 may transmit by RRC signaling, to each UE 100, setting information for performing frequency hopping as illustrated in FIG. 11, or may transmit on the PDCCH, to each UE 100, DCI for performing the frequency hopping.

The setting information or the DCI may include a list of a transmission resource block and a transmission component carrier for each SC-FDMA symbol. For example, the list may be: resource blocks #10 to #15 of a component carrier #0 for a symbol #0, resource blocks #16 to #21 of a component carrier #0 for a symbol #1, no transmission for symbols #2 and #3, resource blocks #1 to #4 of a component carrier #1 for a symbol #4, etc.

Alternatively, if the frequency division is not performed within the component carrier, the setting information or the DCI may include a list of the transmission component carrier for each SC-FDMA symbol. For example, the list may be: a component carrier #1 for a symbol #0, no transmission for a symbol #1, a component carrier #1 for a symbol #2 etc.

The setting information or the DCI may include information indicating a number of frequency divisions for each component carrier. For example, the information may be: no division, two divisions, three divisions, etc.

Modification of Second Embodiment

A modification of the second embodiment will be described, below. In the modification of the second embodiment, a case is assumed where an uplink radio signal transmitted by frequency hopping in units of symbols, is an SRS.

First Modification

In a first modification of the second embodiment, the eNB 200 transmits, to the UE 100, information for setting a transmission parameter for transmitting an SRS. Such information is transmitted by RRC signaling or DCI. The RRC signaling is a UE-specific RRC signaling. Alternatively, the RRC signaling may be broadcast RRC signaling.

The UE 100 receives the information from the eNB 200 and transmits the SRS in accordance with the transmission parameter set by the eNB 200. The transmission parameter includes at least one of: a component carrier (CC) used for transmitting the SRS, a resource block (RB) used for transmitting the SRS, a subframe used for transmitting the SRS, and a symbol used for transmitting the SRS.

One or a plurality of RBs used for transmitting the SRS may be determined by a frequency hopping pattern of the SRS. In this case, the eNB 200 sets, to the UE 100, a transmission parameter indicating the frequency hopping pattern of the SRS.

The frequency hopping of the SRS is set independently to each CC set to the UE 100. In other words, the frequency hopping pattern of the SRS is set individually for each CC. Hereinafter, such a case is referred to as "CC-specific setting".

Alternatively, the frequency hopping of the SRS is set collectively to a plurality of CCs set to the UE 100. In other words, the frequency hopping pattern of the SRS is set over the plurality of CCs. Hereinafter, such a case is referred to as "multiple CCs collective setting".

First, a case of the CC-specific setting will be described. FIG. 12 is a diagram illustrating an example of the CC-specific setting. In an example of FIG. 12, two CCs #0 and #1 used for transmitting the SRS are set to the UE 100. The CC #0 may be a CC used for transmitting uplink data and transmitting an SRS (that is, a normal UL CC). The CC #1 may be a CC not used for transmitting uplink data but used for transmitting an SRS (that is, an SRS CC). Such a type of CC may be set to the UE 100 by the eNB 200. It is noted that both of the CCs #0 and #1 are TDD carriers.

As illustrated in FIG. 12, the frequency hopping pattern of the SRS is set individually for each CC. In the CC #0, each of subframes #0 to #3 is set as a subframe used for transmitting an SRS. Further, a last symbol (last SC-FDMA symbol) # n of each subframe is set as a symbol used for transmitting an SRS. Moreover, in a symbol interval used for transmitting the SRS, the CC #0 is divided into three sub-bands #0 to #2 in the frequency direction. Each sub-band may be configured by a plurality of RBs. The eNB 200 may set, to the UE 100, the number of divisions of the CC or a bandwidth of the sub-bands. The UE 100 transmits the SRS in each of a sub-band #0 of the last symbol # n of the subframe #0, a sub-band #1 of the last symbol # n of the subframe #1, a sub-band #2 of the last symbol # n of the subframe #2, and a sub-band #0 of the last symbol # n of the subframe #3.

Further, in the CC #1, each of the subframes #0 to #3 is set as a subframe used for transmitting the SRS. Further, three symbols #(n−3) to #(n−1) of each subframe are set as a symbol used for transmitting the SRS. Moreover, in the symbol interval used for transmitting the SRS, the CC #1 is divided into three sub-bands #0 to #2 in the frequency direction. In each subframe of the CC #1, the UE 100 transmits the SRS while switching the sub-bands (the plurality of RBs) in units of symbols. As a result, the eNB 200 can estimate all the CSI of the CC #1 in one subframe.

However, the UE 100 has no capability of performing simultaneous transmission on the plurality of CCs. For example, the UE 100 has only one transmitter, and the transmitter cannot perform simultaneous transmission on the plurality of CCs. Alternatively, the CCs #0 and #1 belong to a frequency band in which simultaneous transmission is preferably not performed on the plurality of CCs. In particular, the UE 100 having no capability of performing the simultaneous transmission on the plurality of CCs, has difficulty in continuously performing transmission by one CC and transmission on the other CC. Specifically, the UE 100 needs to perform a process for switching the CCs between the transmission on one CC and the transmission on the other CC.

The eNB 200 sets, to the UE 100, a switching gap being a transmission stop duration for such switching. In an example in FIG. 12, the eNB 200 sets, to the UE 100, a symbol #(n−1) of each subframe as the switching gap. For example, the eNB 200 may set, to the UE 100, a symbol number of a symbol included in the switching gap, as a transmission parameter. The symbol number included in the switching gap may be independently set for each CC or may be commonly set for the plurality of CCs. Alternatively, the UE 100 may autonomously set the switching gap.

The UE 100 stops transmission during the switching gap and performs switching from one CC to the other CC. In the example of FIG. 12, the UE 100 stops transmission of the SRS in the symbol #(n−1) of the subframe #0 of the CC #1 and switches the transmission carrier to the CC #0. After switching the transmission carrier, the UE 100 transmits the SRS in a symbol # n of the subframe #0 of the CC #0. Here, an SRS transmission contentious with the switching gap may be postponed to a symbol with which transmission is possible next in the same CC. In the example of FIG. 12, the UE 100 stops an SRS transmission in the sub-band #2 contentious with the switching gap in the subframe #0. Thus, the UE 100 performs the SRS transmission in the sub-band #2 in a symbol #(n−3) being the first SRS transmission timing of the next subframe #1. Subsequently, the UE 100 performs the SRS transmission in the sub-band #0 in a symbol #(n−2) of the subframe #1. Thereafter, the UE 100 repeats such an operation.

Next, a case of the multiple CCs collective setting will be described. FIG. 13 is a diagram illustrating an example of the multiple CCs collective setting. In the example of FIG. 13, two CCs #0 and #1 used for transmitting the SRS are set to the UE 100. The CCs #0 and #1 may be a CC (SRS CC) not used for transmitting uplink data, but used for transmitting an SRS. Description proceeds, below, focusing mainly on a difference from the case of the CC-specific setting.

As illustrated in FIG. 13, the frequency hopping pattern of the SRS is set over the CCs #0 and #1. In the CCs #0 and #1, each of subframes #0 to #3 is set as a subframe used for transmitting the SRS. Further, five symbols #(n−4) to # n of each subframe are set as symbols used for transmitting the SRS.

In the example of FIG. 13, the UE 100 transmits, in the subframe #0 of the CC #0, the SRS in each of the sub-band #0 of the symbol #(n−4), the sub-band #1 of the symbol #(n−3), and the sub-band #2 of the symbol #(n−2). Thus, the UE 100 performs the frequency hopping in units of sub-bands (plurality of RBs) in the CC #0. Then, the UE 100 switches the transmission carrier to the CC #1.

When the CC is switched, the above-described switching gap is provided. In the example of FIG. 13, the symbol #(n−1) of the subframe #0 of the CC #1 is set as the switching gap. The CC number and/or the symbol number included in the switching gap may be set by the eNB 200 to the UE 100. Alternatively, instead of such an explicit setting, an implicit setting may be used. For example, the eNB 200 sets, as a rule for determining the CC in which the switching gap is provided, any one of the following rules to the UE 100.

A CC equivalent to a primary cell is prioritized and the switching gap is provided in a CC equivalent to another cell. The primary cell is a cell in which PUCCH and RRC signaling are transmitted in carrier aggregation. The "CC equivalent to another cell" includes a CC equivalent to a secondary cell or an SRS CC, for example.

A CC equivalent to an activated cell is prioritized, and the switching gap is provided in a CC equivalent to another cell. Activating means a state where a start of using is instructed by a MAC control element or the like to a cell set by RRC signaling.

A CC to be switched is prioritized, and the switching gap is provided in a switched CC.

A switched CC is prioritized, and the switching gap is provided in a CC to be switched.

The priority between CCs is explicitly notified from the eNB 200, and the switching gap is provided in a CC having a low priority.

Alternatively, it may be possible that a rule as described above is previously set to the UE 100 and the UE 100 autonomously sets the switching gap.

It is noted that in the multiple CCs collective setting, the eNB 200 my set at least one common transmission parameter commonly applied to the plurality of CCs, to the UE 100. The common transmission parameter is a parameter not depending on the bandwidth of each CC and may include an index of the SRS setting (srs-ConfigIndex), for example. Further, the eNB 200 may set at least one individual transmission parameter applied individually to the CC, to the UE 100. The individual transmission parameter is a parameter not depending on the bandwidth of each CC.

Second Modification

In the above-described second embodiment and modification thereof, the example is described in which the frequency hopping for switching the sub-bands (plurality of RBs) in units of symbols is performed in the subframe used for transmitting the SRS. In this case, the UE 100 transmits the SRS in each of the contiguous symbols. That is, the UE 100 continuously transmits the SRS in the subframe.

However, the UE 100 may intermittently transmit the SRS in the subframe. Further, the eNB 200 may set a symbol interval used for transmitting the SRS, to the UE 100. The UE 100 intermittently transmits the SRS according to the set interval.

Figure 14A:
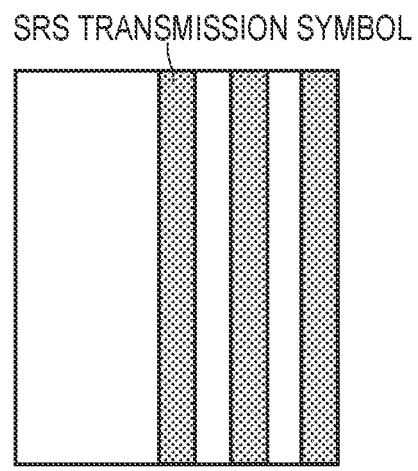
FIGS. 14A and 14B are diagrams illustrating a second modification of the second embodiment.
Figure 14B:
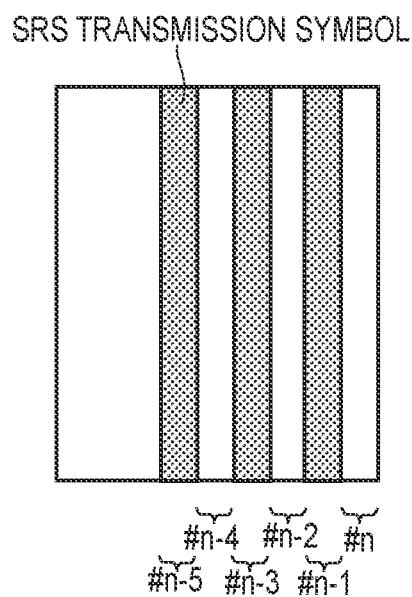

FIGS. 14A and 14B are diagrams illustrating a second modification of the second embodiment. In an example of FIGS. 14A and 14B, in the subframe used for transmitting the SRS, an interval equivalent to one symbol is provided between symbols used for transmitting the SRS (SRS transmission symbols). In this case, there are two patterns (a) and (b), that is, a first transmission pattern for transmitting the SRS in an even-numbered symbol and a second transmission pattern for transmitting the SRS in an odd-numbered symbol. The eNB 200 sets either one of the patterns, to the UE 100. The UE 100 transmits the SRS in the SRS transmission symbol set from the eNB 200. When such an intermittent transmission pattern is defined, it is possible to multiplex the SRS transmission in a time-division manner. Specifically, when one pattern (a) is set to a first UE and the other pattern (b) is set to a second UE, it is possible to prevent conflict of the SRS transmission between the first UE and the second UE. It is noted that instead of the interval equivalent to one symbol as illustrated in FIGS. 14A and 14B, an interval equivalent to two or three symbols may be provided.

The UE 100 may perform the SRS transmission as illustrated in FIGS. 14A and 14B by switching the CCs. For example, the UE 100 utilizes, in one subframe, a resource (odd-numbered symbol) such as a symbol #(n−5) in a CC #0, a symbol #(n−3) in a CC #1, and a symbol #(n−1) in the CC #0 (or a CC #2) to perform the transmission while always providing a gap. In this case, for example, when another UE is set to a resource (even-numbered symbol) such as a symbol #(n−4) in the CC #0, a symbol #(n−2) in the CC #1, and the CC #0 (or the CC #2), it is possible to secure an orthogonal resource.

Third Modification

In the above-described second embodiment and modifications thereof, a case where the number of CCs on which simultaneous transmission is possible, as the capability of the UE 100, is one is mainly described. For example, the number of CCs used for the uplink transmission is one and the number of CCs used for the downlink transmission is two or more. It is noted that for the uplink, two CCs may be set while for simultaneous transmission (including the data transmission), only one CC may be set.

However, there may be also a case where the number of CCs on which simultaneous transmission is possible, as the capability of the UE 100, is two or more. An example will be described, below, where the number of CCs on which the UE 100 can perform simultaneous transmission is two; however, the number of CCs on which the UE 100 can perform simultaneous transmission may be three or more.

FIG. 15 is a first diagram illustrating a third modification of the second embodiment. As illustrated in FIG. 15, three CCs, that is, a CC #0 to a CC #2, are set to the UE 100. Each of the CC #0 to the CC #2 is a TDD carrier. The CC #0 and the CC #2 are a CC used for transmitting uplink data. That is, "2UL CA" being carrier aggregation using two UL CCs is set to the UE 100. Alternatively, a case may be assumed where the number of set CAs (the number of CCs for data transmission) is one but the UE 100 can the capability of the 2UL CA. Further, any one of the CC #0 to the CC #2 is a CC used for transmitting downlink data. That is, "3DL CA" being carrier aggregation using three DL CCs is set to the UE 100.

Here, the CC #1 is a CC (SRS CC) not used for transmitting uplink data, but used for transmitting an SRS. The UE 100 to which the "2UL CA" is set is permitted to perform simultaneous transmission on the two CCs but is not permitted to perform simultaneous transmission on the three CCs. Thus, a mechanism to prevent simultaneous transmission of the SRS on the three CCs is needed.

Figure 16:
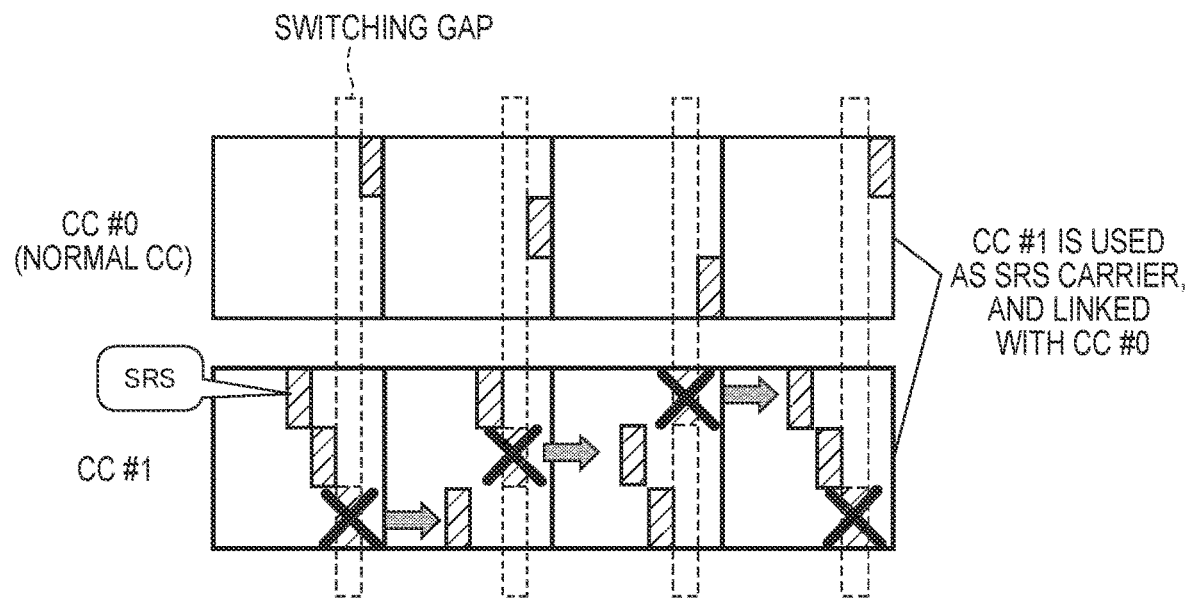
FIG. 16 is a second diagram illustrating the third modification of the second embodiment.

FIG. 16 is a second diagram illustrating the third modification of the second embodiment. As illustrated in FIG. 16, the eNB 200 sets a CC group including CCs on which the simultaneous transmission of the SRS is not performed, to the UE 100. The CC group includes a first CC (normal UL CC) used for transmitting the uplink data and the SRS and a second CC (SRS CC) not used for transmitting the uplink data but used for transmitting the SRS. It is noted that the number of CCs included in the CC group by which the simultaneous transmission of the SRS is not performed may be three or more.

The UE 100 controls so that the simultaneous transmission of the SRS on the first CC and the second CC is not performed. In the example of FIG. 16, the eNB 200 sets, as the SRS CC, the CC #1 to the UE 100, and sets the CC #1 in a manner to be linked with the CC #0 (normal UL CC), to the UE 100. The UE 100 does not perform the simultaneous transmission of the SRS between the CC #0 and the CC #1. Further, when the CC #0 and the CC #1 are switched, the above-described switching gap is provided. Thus, the simultaneous transmission of the SRS between the CC #0 and the CC #1 is not performed, and as a result, it is possible to prevent the simultaneous transmission of the SRS on the three CCs. However the UE 100 may perform the simultaneous transmission of the SRS between the CC #0 and the CC #2, and may perform the simultaneous transmission of the SRS between the CC #1 and the CC #2.

However, it is preferred that when the UE 100 is located at the cell end, the SRS transmission is performed on a single CC because of the limitation of the transmission power of the UE 100. Thus, the eNB 200 may set the CC #0 to CC #2, as a CC group by which the simultaneous transmission of the SRS is not performed, to the UE 100.

Fourth Modification

In the above-described second embodiment and modifications thereof, a case where the time length of the switching gap is constant is mainly described. However, depending on the capability of the transmitter of the UE 100 and/or the frequency interval between CCs, a time required for switching the CCs may change. For example, a carrier switching between CCs not contiguous (non-contiguous CCs) in a frequency direction may take longer time than a carrier switching between CCs contiguous (contiguous CCs) in the frequency direction.

Thus, in consideration of the capability of the UE 100 and/or the CC set to the UE 100, the eNB 200 may set the time length of the switching gap for each UE 100. That is, the eNB 200 sets a transmission parameter indicating the time length of the switching gap, to the UE 100. The UE 100 may notify the eNB 200 of capability information indicating a time required for the carrier switching between the transmission on one CC and the transmission on another CC. The eNB 200 may set, based on the capability information notified from the UE 100, the time length of the switching gap, to the UE 100.

Alternatively, in consideration of the capability of the UE 100 and/or the CC set to the UE 100, the UE 100 may autonomously set the time length of the switching gap. In this case, the UE 100 may notify the eNB 200 of information (time length and/or a symbol position) on the autonomously set switching gap. Alternatively, the UE 100 may notify the eNB 200 of information (time length and/or the symbol position) on the switching gap for which the UE 100 requires the setting. The eNB 200 may set, based on the switching gap required from the UE 100, the switching gap, to the UE 100.

Fifth Modification

In the above-described second embodiment and modifications thereof, a case is mainly described where a periodically transmitted SRS (that is, a Periodic SRS) is used. However, the SRS may be transmitted aperiodically (Aperiodic).

Generally, an aperiodic SRS is transmitted according to the following procedure. Firstly, the eNB 200 sets, by RRC signaling, the transmission parameter of the aperiodic SRS, to the UE 100. Next, the eNB 200 transmits by DCI to the UE 100 an SRS transmission trigger (1-bit flag). The UE 100 transmits, in response to reception of the SRS transmission trigger, an SRS based on the transmission parameter, to eNB 200. The transmission parameter of the aperiodic SRS includes srs-AntennaPortAp indicating an SRS transmission antenna port, srs-BandwidthAp and freqDomainPositionAp indicating an SRS transmission RE (the transmission bandwidth and the frequency position), transmissionCombAp indicating an SRS transmission subcarrier, and cyclicShiftAp indicating an SRS cyclic shift.

On the other hand, in a fifth modification of the second embodiment, the eNB 200 notifies the UE 100 of at least one of an SRS transmission CC, the SRS transmission RB, and an SRS transmission symbol position, at the time of transmission of the SRS transmission trigger. The SRS transmission CC is a CC used for transmitting the SRS. The SRS transmission RB is one or a plurality of RBs used for transmitting the SRS. The SRS transmission symbol is a symbol position (symbol number) used for transmitting the SRS. These parameters are transmitted by the DCI from the eNB 200 to the UE 100. These parameters may be treated as an implicit SRS transmission trigger. Alternatively, these parameters may be transmitted by an MAC control element from the eNB 200 to the UE 100.

The UE 100 transmits, in response to reception of the SRS transmission trigger, to the eNB 200 the SRS that complies with the transmission parameter designated by the DCI (or the MAC control element) from the eNB 200. The UE 100 may transmit the SRS, based at least on some of the parameters set by the RRC signaling, in addition to the transmission parameter designated during the SRS transmission trigger. The UE 100 may apply the transmission parameter designated during the SRS transmission trigger, instead of some of the parameters set by the RRC signaling.

Alternatively, the setting of the aperiodic SRS may be set, by the RRC signaling, for each CC, and in the DCI, a trigger including CC designation information may be notified. Specifically, the eNB 200 sets, by the RRC signaling, the transmission parameter, which is associated with the CC, of the aperiodic SRS, to the UE 100. Next, the eNB 200 transmits, by DCI, the SRS transmission trigger including the information indicating the CC, to the UE 100. The UE 100 transmits the aperiodic SRS by using the transmission parameter corresponding to the CC indicated by the SRS transmission trigger.

Sixth Modification

In the above-described second embodiment and modifications thereof, in a case where there are a plurality of UEs 100 configured to transmit the periodic SRS, allocation control of an SRS transmission resource and an SRS orthogonal sequence may be complicated. Further, in a case where a periodic SRS and an aperiodic SRS are used together, it is preferable that the transmission of the periodic SRS can be temporarily stopped.

Figure 17:
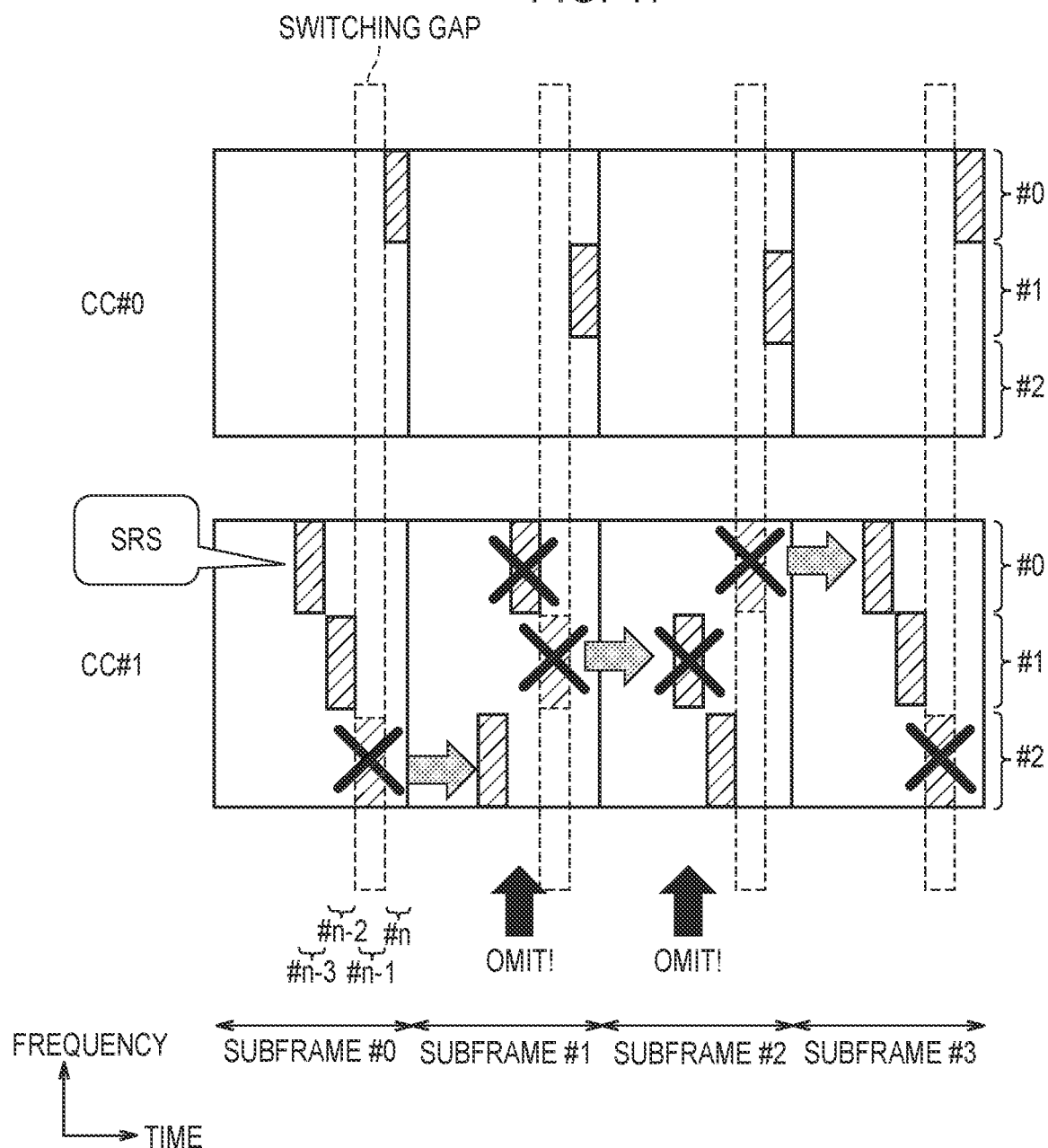
FIG. 17 is a diagram illustrating a sixth modification of the second embodiment.

FIG. 17 is a diagram illustrating a sixth modification of the second embodiment. As illustrated in FIG. 17, the eNB 200 transmits information for instructing a stop of transmission of the SRS, to the UE 100 configured to periodically transmit the SRS. The UE 100 stops the transmission of the SRS, in response to the instruction from the eNB 200. The eNB 200 may instruct the UE 100 to resume the transmission (activation) of the SRS after instructing the UE 100 to stop transmission (deactivation) of the SRS. In this case, the UE 100 resumes the transmission of the SRS, in response to the instruction from the eNB 200. Alternatively, the instruction of the stop of transmission of the SRS may be an instruction of one-time transmission stop (one-shot deactivation). Alternatively, the instruction of the stop of transmission of the SRS may include information for designating a period for stopping the transmission. In this case, the UE 100 resumes the transmission of the SRS after the period passes by. The instruction from the eNB 200 may be performed by the DCI or performed by the MAC control element.

Seventh Modification

In the above-described second embodiment and modifications thereof, a case where the switching gap is set for switching the CC for transmitting the SRS is mainly described. However, the symbol for transmitting the SRS on one CC may be adjacent, in the time direction, to the symbol for transmitting the uplink data on the other CC. In this case, the UE 100 not capable of performing simultaneous transmission on the plurality of CCs may need to provide the switching gap for switching the CC.

In a seventh modification of the second embodiment, the UE 100 performs a process of transmitting the SRS on the first CC and a process of transmitting the uplink data on the second CC. The UE 100 stops, if a first symbol used to transmit the SRS and the second symbol used to transmit the uplink data are adjacent in the time direction, the transmission of one of the first symbol and the second symbol. For example, the UE 100 stops the transmission of a first symbol of the uplink data or a last symbol of the uplink data, and uses a symbol interval in which the transmission is stopped, as the switching gap. Alternatively, to prioritize the transmission of the uplink data, the UE 100 may stop the transmission of the SRS (the first symbol). Alternatively, as described in the first modification of the second embodiment, a rule for determining the CC in which the switching gap is provided may be set by the eNB 200 to the UE 100.

Third Embodiment

A third embodiment will be described while focusing on a difference from the first embodiment and the second embodiment, below. In the above-described first embodiment and second embodiment, an operation after the synchronization and the RRC connection are established between the UE 100 and the eNB 200 was described. On the other hand, the third embodiment relates to a random access procedure for establishing the synchronization and the RRC connection between the UE 100 and the eNB 200. It is noted that in the third embodiment, the TDD system is not always preconditioned.

Random Access Procedure

Figure 18:
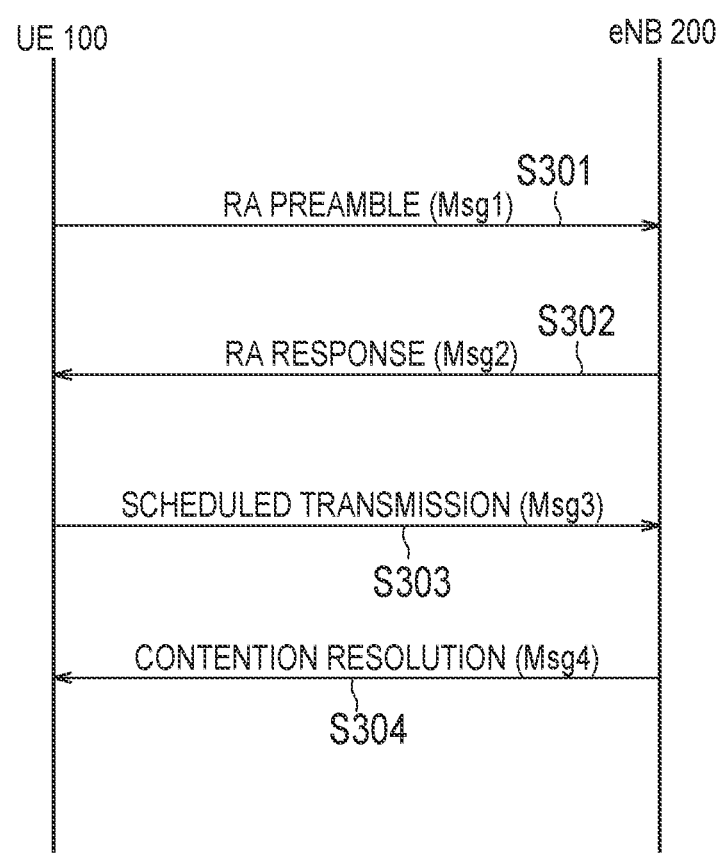
FIG. 18 is a sequence diagram illustrating a general random access procedure.

An overview of the random access procedure will be described. FIG. 18 is a sequence diagram illustrating a general random access procedure. In an initial state in FIG. 18, in the cell of the eNB 200, the UE 100 is in an RRC idle mode or in an RRC connected mode. To perform an initial connection (Initial access) in the RRC idle mode, the UE 100 performs the random access procedure illustrated in FIG. 18. Alternatively, if the uplink synchronization state is non-synchronized in the RRC connected mode, the UE 100 may perform the random access procedure to perform the uplink transmission.

As illustrated in FIG. 18, in step S301, the UE 100 transmits, to the eNB 200, a random access preamble (RA Preamble) over RACH. It is noted that an uplink radio resource (PRACH resource) available as the RACH is provided at a rate of one subframe for every radio resource, for example, and includes central six resource blocks in the frequency direction. The PRACH resource is used to transmit the random access preamble from the UE 100, but is not used for transmitting data. Further, the "RA Preamble" may be referred to as Msg 1. The "RA Preamble" is a signal for performing a random access to the eNB 200 from the UE 100 in the MAC layer. The eNB 200 receives the "RA Preamble".

In step S302, the eNB 200 transmits, to the UE 100, a random access response (RA Response) on DL-SCH (PDSCH). The "RA Response" is a type of MAC control element (MAC CE), and may be referred to as Msg 2. Specifically, the eNB 200 estimates an uplink delay between the eNB 200 and the UE 100, based on the "RA Preamble" received from the UE 100. Further, the eNB 200 decides an uplink radio resource to be allocated to the UE 100. Then the eNB 200 transmits the "RA Response" including a timing correction value (TA: Timing Advance) based on a result of the delay estimation, allocation information (UL grant) of the radio resource, a preamble identifier (Preamble ID), and "Temporary C-RNTI", to the UE 100. It is noted that the "Preamble ID" is ID indicating a signal sequence of the "RA Preamble" received from the UE 100. Further, in the physical layer (PDCCH), a dedicated RNTI (RA-RNTI) is used for transmitting the "RA Response". The UE 100 receives the "RA Response".

In step S303, the UE 100 performs an uplink transmission (Scheduled Transmission) to the eNB 200 on the UL-SCH (PUSCH), based on the "RA Response". The "Scheduled Transmission" may be referred to as Msg 3. In the initial connection (Initial access), the "Scheduled Transmission" is an "RRC Connection Request" message. Otherwise, (that is, if the C-RNTI is assigned to the UE 100), the "Scheduled Transmission" is a message including the C-RNTI of the UE 100. The eNB 200 receives the "Scheduled Transmission".

In step S304, the eNB 200 transmits a Contention Resolution message to the UE 100. The "Contention Resolution" message may be referred to as Msg 4. The "Contention Resolution" message includes a content of the message received from the UE 100 in step S303. In the initial connection (Initial access), in the physical layer (PDCCH), the "Temporary C-RNTI" is used for transmitting the "Contention Resolution" message. If the C-RNTI is assigned to the UE 100, in the physical layer (PDCCH), the "C-RNTI" is used for transmitting the "Contention Resolution" message. The UE 100 receives the "Contention Resolution" message.

Operation According to Third Embodiment

Next, an operation according to the third embodiment will be described. The eNB 200 according to the third embodiment performs a process of receiving the random access preamble from the UE 100, and a process of transmitting, to the UE 100, the random access response corresponding to the random access preamble with a demodulation-use reference signal specific to a UE. The demodulation-use reference signal specific to a UE is referred to as UE-specific RS. The UE-specific RS is included in an allocated radio resource (PDSCH resource) allocated by the eNB 200 to the UE 100. That is, the UE-specific RS is transmitted in an antenna and the allocated radio resource used for transmitting the downlink data to the UE 100. Further, the downlink transmission weight similar to that of the corresponding downlink data is applied to the UE-specific RS. As a result, it is possible to perform a sophisticated PDSCH transmission by MIMI or beamforming or the like from the stage of the random access response (Msg 2).

In the third embodiment, the eNB 200 performs a process of deriving a downlink transmission weight for the UE 100, based on the channel estimation result using the random access preamble, and a process of transmitting, to the UE 100, the random access response together with the UE-specific RS by using the downlink transmission weight.

In the third embodiment, the downlink resource block used for transmitting the random access response may overlap, in the frequency direction, with the uplink resource block used for transmitting the random access preamble. In this case, the eNB 200 may transmit the random access response to the UE 100, without transmitting the allocation information of the downlink resource block to the UE 100. In other words, the eNB 200 omits the PDCCH transmission and transmits the random access response (PDSCH transmission).

Figure 19:
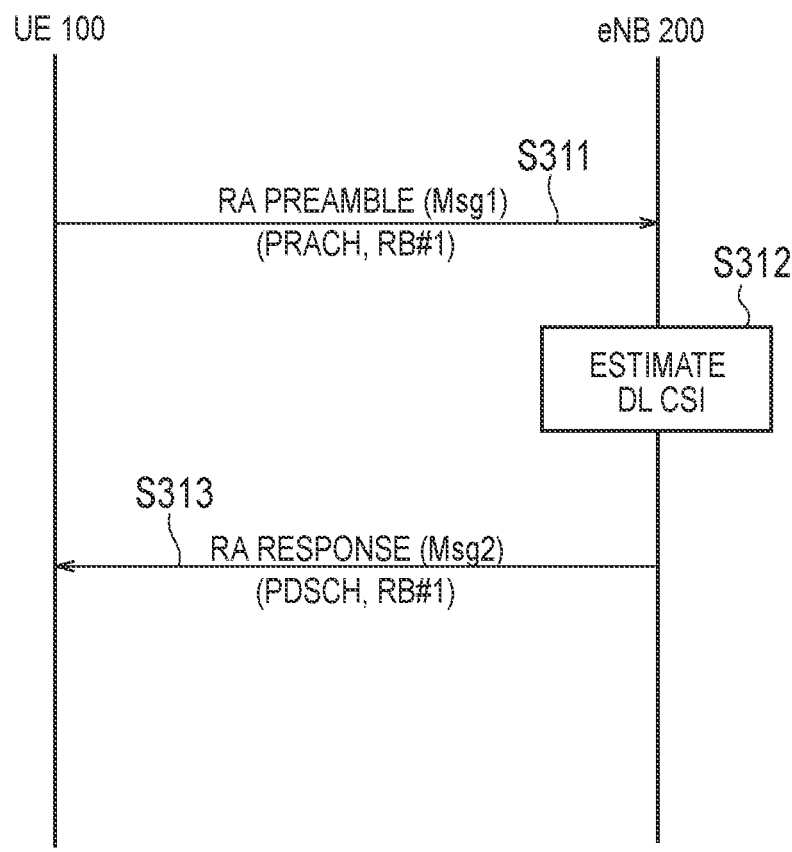
FIG. 19 is a sequence diagram illustrating an example of an operation according to a third embodiment.

FIG. 19 is a sequence diagram illustrating an example of the operation according to the third embodiment. Here, description proceeds while focusing on a difference from the general random access procedure described above.

As illustrated in FIG. 19, in step S311, the UE 100 transmits the random access preamble (RA Preamble) by an uplink resource block (here, a resource block #1) included in the PRACH resource, to the eNB 200. The eNB 200 receives the "RA Preamble".

In the third embodiment, the UE 100 attempts the PDSCH reception after transmitting the "RA Preamble". Specifically, the UE 100 attempts the PDSCH reception, in the same resource block (the resource block #1) as the uplink resource block used for transmitting the "RA Preamble" and at a candidate timing at which the reception of the random access response (RA Response) is expected.

In step S312, the eNB 200 estimates the uplink delay between the eNB 200 and the UE 100 by using the "RA Preamble" received from the UE 100. In the third embodiment, the eNB 200 performs the channel estimation by using the "RA Preamble" received from the UE 100. It is noted that the channel estimation using the "RA Preamble", which is a process of estimating an attenuation and a phase rotation or the like received when the "RA Preamble" goes through a propagation channel, differs from a process of estimating the uplink delay. Then, the eNB 200 estimates downlink CSI by utilizing the channel reversibility. The downlink CSI includes the downlink transmission weight (precoder).

In step S313, the eNB 200 applies the downlink transmission weight (precoder) to transmit the "RA Response" on the PDSCH to the UE 100. In the third embodiment, the eNB 200 transmits the "RA Response" to the UE 100 by using a part or all (resource block #1) of the uplink resource block used for transmitting the "RA Preamble". At that time, the eNB 200 does not perform the PDCCH transmission to the UE 100. Further, during the PDSCH transmission, the eNB 200 applies the downlink transmission weight (precoder) to transmit the UE-specific RS.

As described above, the UE 100 receives the "RA Response" without performing the PDCCH reception, by attempting the reception of the PDSCH of the same resource block (resource block #1) as the uplink resource block used for transmitting the "RA Preamble". Further, the UE 100 demodulates the "RA Response" by the channel estimation using the UE-specific RS. The subsequent operation is similar to that of the general random access procedure described above.

Other Embodiments

In the above-described first embodiment to third embodiment, an interleave-division multiple access (IDMA) has not been particularly mentioned. However, the IDMA may be applied to the first embodiment to the third embodiment. The IDMA is a technology by which a signal of a different UE 100 is distinguished and separated by a UE-specific interleaver. For example, the UE multiplexing order may increase by applying the IDMA to the ACK/NACK according to the first embodiment.

The above-described first embodiment to third embodiment may be performed individually and may also be performed in combination of two or more of the embodiments. If the two or more embodiments are combined, a part of one embodiment may be replaced with a part of another embodiment. For example, the method of transmitting the PRACH (random access preamble) according to the third embodiment may be applied to the transmission of the SRS according to the second embodiment.

In the above-described embodiment, the LTE system is exemplified as the mobile communication system. However, the present application is not limited to the LTE system. The present application may be applied to a mobile communication system other than the LTE system.

INDUSTRIAL APPLICABILITY

The application of the present application is useful in the field of communication.

The invention claimed is:

1. A radio terminal, comprising:
a controller including a processor and a memory coupled to the processor, the processor configured to:
perform radio communication in a time division duplex system, with a base station;
transmit an uplink radio signal to the base station while switching a resource block and/or a component carrier used for transmitting the uplink radio signal, in units of predetermined number of symbols instead of in units of subframes or in units of slots;
in response to a plurality of component carriers being set to the radio terminal from the base station, transmit the uplink radio signal to the base station while switching, in units of the predetermined number of symbols, a component carrier used for transmitting the uplink radio signal, within the range of the plurality of component carriers;
receive, from the base station, priority information indicating priority of the plurality of component carriers;
identify a first component carrier and a second component carrier based on the priority information, the first component carrier having a priority lower than a priority of the second component carrier;
set a switching gap equivalent to one or a plurality of symbols, between transmission on the first component carrier and a transmission on the second component carrier; and
stop the transmission on the first component carrier having the lower priority during the switching gap.

2. The radio terminal according to claim 1, wherein the processor is configured to transmit to the base station, the uplink radio signal while switching the component carrier used for transmitting the uplink radio signal in units of the predetermined number of symbols so that a transmission timing does not overlap on the plurality of component carriers.

3. The radio terminal according to claim 1, wherein the processor is further configured to:
receive, from the base station, information for setting a transmission parameter for transmission of the uplink radio signal; and
transmit the uplink radio signal according to the transmission parameter set from the base station, and
the transmission parameter includes at least one of a component carrier used for transmitting the uplink radio signal, a resource block used for transmitting the uplink radio signal, a subframe used for transmitting the uplink radio signal, and a symbol used for transmitting the uplink radio signal.

4. The radio terminal according to claim 3, wherein the transmission parameter includes a parameter for setting the switching gap.

5. The radio terminal according to claim 3, wherein
the transmission parameter includes a parameter for setting a hopping pattern of a frequency hopping across a plurality of component carriers, and
the processor is configured to transmit the uplink radio signal by the frequency hopping across the plurality of component carriers according to the hopping pattern.

6. The radio terminal according to claim 3, wherein
the transmission parameter includes a parameter for setting an interval of symbols used for transmitting the uplink radio signal, and
the processor is configured to intermittently transmit the uplink radio signal according to the interval.

7. The radio terminal according to claim 3, wherein
the uplink radio signal is a sounding reference signal,
the transmission parameter includes a parameter for setting a component carrier group,
the component carrier group includes:
a first component carrier used for transmitting uplink data and the sounding reference signal; and
a second component carrier not used for transmitting the uplink data but used for transmitting the sounding reference signal, and
the processor is configured to control so that simultaneous transmission of the sounding reference signal is not performed on the first component carrier and the second component carrier.

8. The radio terminal according to claim 1, wherein
the processor is further configured to notify the base station of capability information indicating a time required for switching between transmission on one component carrier and transmission on another component carrier or request information indicating the switching gap for requesting setting to the radio terminal.

9. The radio terminal according to claim 1, wherein
the uplink radio signal is a sounding reference signal, and
the processor is configured to:
transmit the sounding reference signal on a first component carrier;
transmit uplink data on a second component carrier; and
stop transmission of one of a first symbol and a second symbol, if the first symbol used to transmit the sounding reference signal and the second symbol used to transmit the uplink data are adjacent in a time direction.

10. The radio terminal according to claim 1, wherein
the second component carrier is a primary cell in which PUCCH and RRC signaling are transmitted in carrier aggregation.

11. A base station, comprising:
a controller including a processor and a memory coupled to the processor, the processor configured to:
perform radio communication with a radio terminal;
receive a random access preamble from the radio terminal using an uplink resource block; and
transmit, to the radio terminal, a random access response corresponding to the random access preamble with a demodulation-use reference signal specific to the radio terminal using a downlink resource block which overlaps, in frequency direction, with the uplink resource block, wherein
the processor is configured to transmit the random access response to the radio terminal without transmitting allocation information of the downlink resource block to the radio terminal.

* * * * *